US011290211B2

(12) United States Patent
Lomayev et al.

(10) Patent No.: US 11,290,211 B2
(45) Date of Patent: Mar. 29, 2022

(54) APPARATUS, SYSTEM AND METHOD OF COMMUNICATING A TRANSMISSION ACCORDING TO A SPACE-TIME ENCODING SCHEME

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Claudio Da Silva, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 461 days.

(21) Appl. No.: 16/495,522

(22) PCT Filed: Sep. 11, 2017

(86) PCT No.: PCT/US2017/050877
§ 371 (c)(1),
(2) Date: Sep. 19, 2019

(87) PCT Pub. No.: WO2018/194705
PCT Pub. Date: Oct. 25, 2018

(65) Prior Publication Data
US 2021/0105091 A1    Apr. 8, 2021

Related U.S. Application Data

(63) Continuation-in-part of application No. 15/278,978, filed on Sep. 28, 2016, now abandoned.
(Continued)

(51) Int. Cl.
*H04L 5/00* (2006.01)
*H04L 1/06* (2006.01)
(Continued)

(52) U.S. Cl.
CPC .......... *H04L 1/0618* (2013.01); *H04L 5/0048* (2013.01); *H04L 27/2613* (2013.01); *H04W 72/0453* (2013.01)

(58) Field of Classification Search
CPC ....... H04L 1/0618; H04L 5/0048; H04L 5/00; H04L 27/2613; H04B 7/0413; H04B 2201/70701; H04W 72/0453
See application file for complete search history.

(56) References Cited

U.S. PATENT DOCUMENTS

2006/0203711 A1* 9/2006 Oh ........................ H04L 5/0048
370/208
2008/0253279 A1 10/2008 Ma et al.
(Continued)

FOREIGN PATENT DOCUMENTS

KR    1020110139755    12/2011
WO    2006012523      2/2006

OTHER PUBLICATIONS

International Search Report and the Written Opinion for International Application No. PCT/US2017/050877, dated Jan. 18, 2018, 15 pages.

(Continued)

Primary Examiner — Rahel Guarino
(74) Attorney, Agent, or Firm — Shichrur & Co.

(57) ABSTRACT

For example, a wireless station may be configured to map a plurality of data symbols to Orthogonal Frequency-Division Multiplexing (OFDM) symbols in a plurality of spatial (space-time) streams, to map a plurality of modulated pilot sequences to the OFDM symbols according to a pilot mapping scheme, and to transmit an OFDM Multiple-Input-Multiple-Output (MIMO) transmission based on the plurality of spatial streams.

24 Claims, 9 Drawing Sheets

Related U.S. Application Data

(60) Provisional application No. 62/487,918, filed on Apr. 20, 2017, provisional application No. 62/305,630, filed on Mar. 9, 2016.

(51) Int. Cl.
*H04W 72/04* (2009.01)
*H04L 27/26* (2006.01)

(56) References Cited

U.S. PATENT DOCUMENTS

| | | |
|---|---|---|
| 2009/0262855 A1 | 10/2009 | Lee et al. |
| 2010/0104037 A1 | 4/2010 | Jongren |
| 2010/0208834 A1 | 8/2010 | Zeist et al. |
| 2011/0026639 A1 | 2/2011 | Rouquette-Leveil et al. |
| 2011/0103341 A1 | 5/2011 | Ko et al. |
| 2011/0305296 A1 | 12/2011 | Van Nee |
| 2012/0269142 A1 | 10/2012 | Porat et al. |
| 2013/0294534 A1 | 11/2013 | Jiang et al. |
| 2014/0105123 A1 | 4/2014 | Kenney et al. |
| 2014/0235287 A1 | 8/2014 | Maltsev et al. |
| 2015/0180560 A1 | 6/2015 | Van Nee et al. |
| 2016/0066338 A1 | 3/2016 | Kwon et al. |
| 2016/0323058 A1 | 11/2016 | Cordeiro et al. |
| 2017/0041050 A1 | 2/2017 | Chol et al. |
| 2017/0265217 A1 | 9/2017 | Lomayev et al. |

OTHER PUBLICATIONS

International Preliminary Report on Patentability for International Application No. PCT/US2017/050877, dated Oct. 31, 2019, 11 pages.
IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Siavash M. Alamouti, "A Simple Transmit Diversity Technique for Wireless Communications", IEEE Journal on Select Areas in Communications, vol. 16, No. 8, Oct. 1998, pp. 1451-1458, 8 pages.
International Search Report and Written Opinion for PCT/US2017/016784, dated May 12, 2017, 10 pages.
Sameer Vermani et al., Pilot Design for Data Section', IEEE 802.11-15/0812r1, Jul. 13, 2015, 17 pages.
Office Action for U.S. Appl. No. 15/278,978, dated Nov. 1, 2017, 23 pages.
Jyoti P.Patra, Prasanta Kumar Pradhan, Poonam Singh and Sarat Kumar Patra,"Joint Channel Estimation and CCI Cancellation for STBC-OFDM in Time Varying Multipath Fading Channel", National Institute Of Technology, India, Sep. 2015, 12 pages.
Jyoti P.Patra and Poonam Singh,"A Comb-Type Pilot Symbol Aided Channel Estimation for STBC based OFDM System over Frequency Selective Channel", National Institute Of Technology, India, 2013, 6 pages.
Lomayev et al., IEEE 802.11-16/0632r0, Performance Analysis of Robust Transmission Modes for MIMO in 11ay, Intel, May 16, 2016, 19 pages.
Office Action for U.S. Appl. No. 15/278,978, dated Apr. 2, 2018, 17 pages.
Advisory Action for U.S. Appl. No. 15/278,978, dated Jun. 29, 2018, 6 pages.
International Preliminary Report on Patentability for International Application No. PCT/US2017/016784, dated Sep. 20, 2018, 7 pages.
Office Action for German Patent Application No. 112017001231.7, dated Jul. 7, 2021, 12 pages.

\* cited by examiner

APPARATUS, SYSTEM AND METHOD OF COMMUNICATING A TRANSMISSION ACCORDING TO A SPACE-TIME ENCODING SCHEME

CROSS REFERENCE

This application claims the benefit of and priority from US Provisional Patent Application No. 62/487,918 entitled "Apparatus, System and Method of Communicating a Transmission According to a Space-Time Encoding Scheme", filed Apr. 20, 2017, and is a Continuation In Part (CIP) of U.S. patent application Ser. No. 15/278,978 entitled "Apparatus, System and Method of Communicating Pilot Signals According to a Diversity Scheme", filed Sep. 28, 2016, which claims the benefit of and priority from US Provisional Patent Application No. 62/305,630 entitled "Apparatus, System and Method of Communicating Pilot Signals According to a Diversity Scheme", filed Mar. 9, 2016, the entire disclosures of which are incorporated herein by reference.

TECHNICAL FIELD

Embodiments described herein generally relate to communicating a transmission according to a space-time encoding scheme.

BACKGROUND

A wireless communication network in a millimeter-wave (mmWave) band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
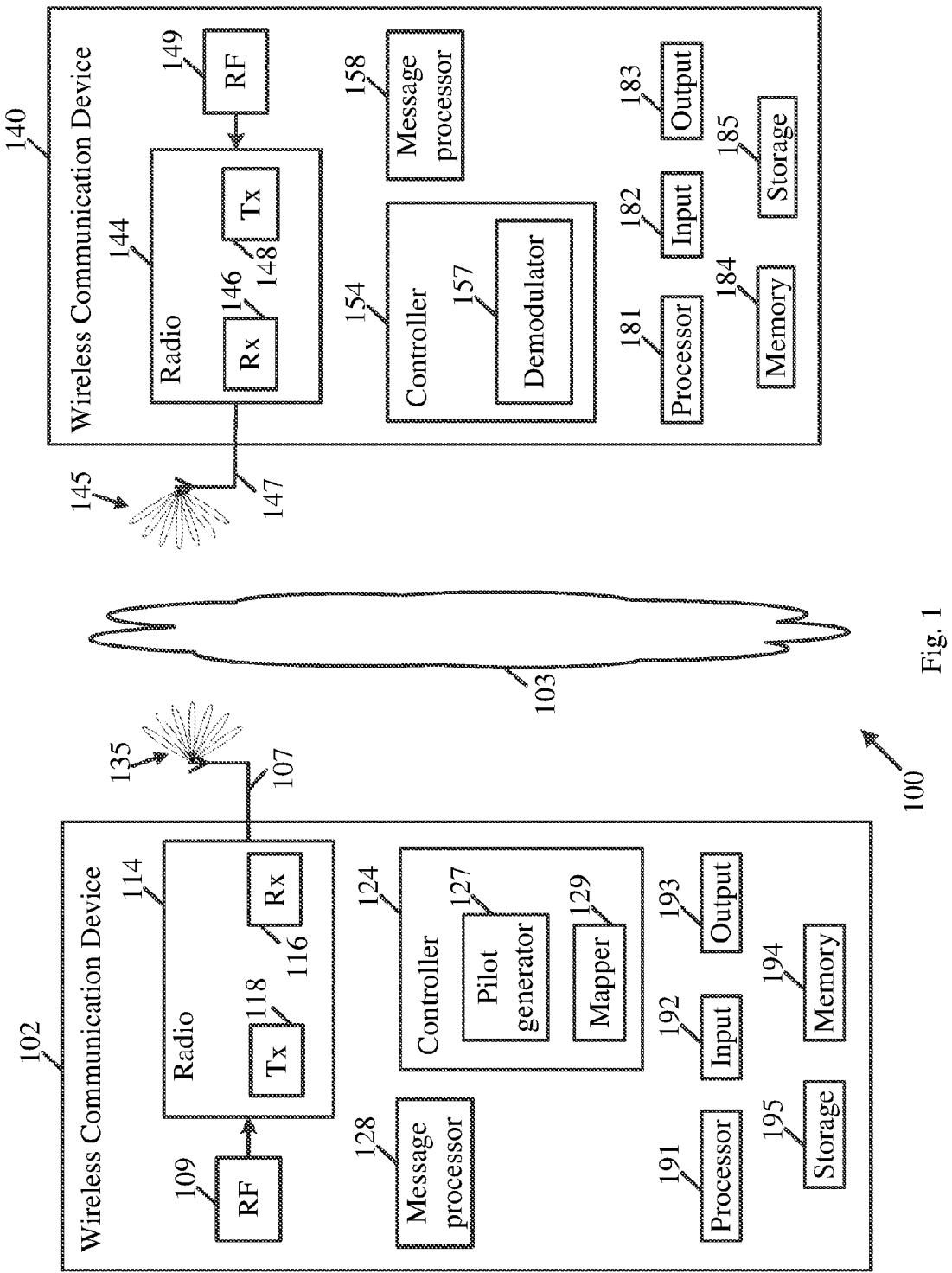
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIND) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAB. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EMDG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
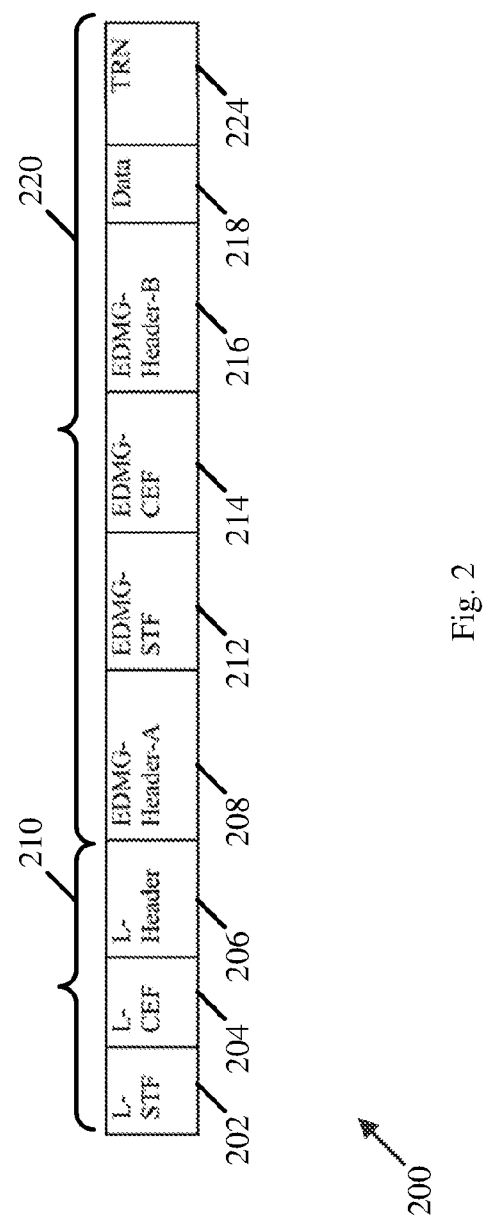
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate EDMG PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

Referring back to FIG. 1, in some demonstrative embodiments, devices 102 and/or 140 may be configured to implement one or more techniques, which may, for example, enable to support communications over a MIMO communication channel, e.g., a SU-MIMO channel between two mmWave STAs, or a MU-MIMO channel between a STA and a plurality of STAs.

In some demonstrative embodiments, devices 102 and/or 140 may be configured to communicate according to an encoding scheme for MIMO transmission, e.g., as described below.

In some demonstrative embodiments, devices 102 and/or 140 may be configured to communicate according to a space-time encoding scheme, which may be configured, for example, for an OFDM MIMO, e.g., as described below.

In some demonstrative embodiments, the space-time encoding scheme may be implemented for example, for communication in accordance with an IEEE 802.11ay Specification, and/or any other standard, protocol and/or specification.

In some demonstrative embodiments, devices 102 and/or 140 may be configured to communicate according to a space-time transmit encoding scheme for OFDM modulation, which may be configured, for example, for 2×N MIMO communication, e.g., as described below. In other embodiments, a space-time transmit encoding scheme for OFDM modulation may be configured, for example, for any other type of MIMO communication, e.g., any other M×N MIMO communication, e.g., wherein N is equal or greater than 2, and M is equal or greater than 2.

In some demonstrative embodiments, devices 102 and/or 140 may be configured to communicate according to a space-time transmit encoding scheme, which may utilize a frequency diversity scheme, for example, according to one or more Dual Carrier Modulation (DCM) techniques.

In some demonstrative embodiments, devices 102 and/or 140 may be configured to communicate according to a space-time transmit encoding scheme, which may extract, for example, both space and frequency diversity.

In some demonstrative embodiments, the space-time transmit encoding scheme may be configured, for example, in compliance with one or more aspects of an Alamouti technique, for example, as described by Siavash M Alamouti, "A Simple Transmit Diversity Technique for Wireless Communications," IEEE Journal on Selected Areas in Communications, vol. 16, no. 8, October 1998.

In one example, the space-time transmit encoding scheme may be configured to support, for example, transmission from 2 Transmit (TX) antennas to N Receive (RX) antennas, for example, for communication according to a 2×N MIMO scheme.

In some demonstrative embodiments, devices 102 and/or 140 may be configured to generate, transmit, receive and/or process one or more OFDM transmissions according to a space-time encoding scheme, e.g., as described below.

Some demonstrative embodiments are described herein with respect to a space-time transmit encoding scheme, which may be configured based on a Space Time Block Coding (STBC) diversity scheme. However, other embodiments may be implemented with respect to any other additional or alternative space-time transmit encoding scheme, which may be configured based on any other frequency diversity scheme, and/or any other space-time diversity scheme, for example, an Alamouti scheme, and/or any other diversity scheme.

In some demonstrative embodiments, a first device ("transmitter device" or "transmitter side"), e.g., device 102, may be configured to generate and transmit an OFDM MIMO transmission based on a plurality of spatial streams (also referred to as "space-time streams"), for example, in accordance with a space-time transmit encoding scheme, e.g., as described below.

In some demonstrative embodiments, a second device ("receiver device" or "receiver side"), e.g., device 140, may be configured to receive and process the OFDM MIMO transmission based on the plurality of spatial streams, for example, in accordance with the space-time transmit encoding scheme, e.g., as described below.

In some demonstrative embodiments, one or more aspects of the space-time transmit encoding scheme described herein may be implemented, for example, to provide at least a technical solution to allow a simple combining scheme at the receiver device, for example, to mitigate and/or cancel out interference, e.g., Inter Stream Interference (ISI), to combine channel diversity gain, which may provide reliable data transmission, e.g., even in hostile channel conditions, and/or to provide one or more additional and/or alternative advantages and/or technical solutions.

For example, in some embodiments, the receiver side may not even be required to use a MIMO equalizer, for example, while being able to use at least only SISO equalizers, e.g., in each stream of the plurality of spatial streams. According to this example, the transmit space-frequency MIMO scheme may be simple for implementation.

In some demonstrative embodiments, a PHY and/or Media Access Control (MAC) layer for a system operating in the 60 GHz band, e.g., the system of FIG. 1, may be defined, for example, in accordance with an IEEE 802.11ad Standard, a future IEEE 802.11ay Standard, and/or any other Standard.

In some demonstrative embodiments, some implementations may be configured to communicate an OFDM MIMO transmission over a directional channel, for example, using beamforming with a quite narrow beamwidth and fast enough signal transmission with typical frame duration, e.g., of about 100 microseconds (usec). Such implementations may allow, for example, having a static channel per entire packet transmission, and/or may enable the receiver side to perform channel estimation at the very beginning of the packet, e.g., using a Channel Estimation Field (CEF). A phase may be tracked, for example, instead of performing channel tracking using pilots. This may allow, for example, assuming a substantially unchanged or static channel over two or more successive symbol transmissions.

In some demonstrative embodiments, devices 102 and/or 140 may be configured to communicate an OFDM MIMO transmission according to a space-time transmit encoding scheme, which may be based on a space-time diversity scheme, for example, an STBC scheme, e.g., an Alamouti diversity scheme, or any other space-time encoding scheme, e.g., as described below.

Figure 3:
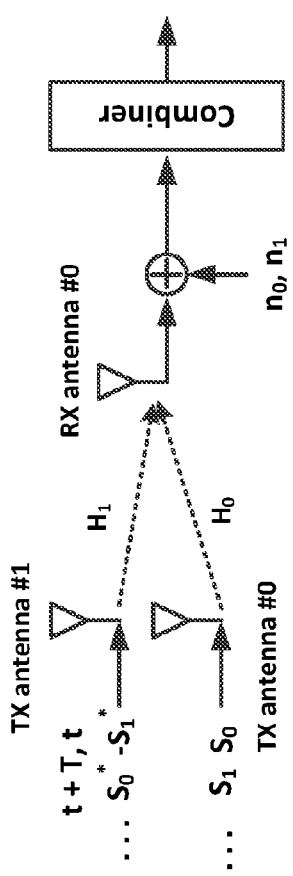
FIG. 3 is a schematic illustration of a transmit space-time diversity scheme, which may be implemented, in accordance with some demonstrative embodiments.

FIG. 3 is a schematic illustration of a space-time transmit diversity scheme, which may be implemented, in accordance with some demonstrative embodiments. For example, the transmit diversity scheme of FIG. 3 illustrates spatial coding for a space-time transmit diversity scheme with a 2×1 configuration.

For example, a space-time encoding scheme may be configured to transmit a signal, denoted $S_0$, and a signal with coding, denoted $-S_1^*$, via two antennas, denoted #0 and #1, at a time moment, denoted t; followed by a repetition of the signals as a signal, denoted $S_1$, and a signal with coding, denoted $S_0^*$, via the antennas #0 and #1, at a subsequent time moment, denoted t+T. The symbol * denotes an operation of complex conjugation. This diversity scheme may create two orthogonal sequences in a space-time domain.

In some demonstrative embodiments, it may be assumed that the channel does not change during consequent vector transmissions, for example, for communications over a narrow beamwidth, e.g., over a directional frequency band, as described above. Accordingly, it may be assumed that the sequential transmissions of the signals $S_0$ and $S_1$ are transmitted through a substantially unchanged or static channel having a substantially unchanged or static channel coefficient $H_0$, and/or that the sequential transmissions of the signals $-S_1^*$ and $S_0^*$ are transmitted through a substantially unchanged or static channel having a substantially unchanged or static channel coefficient $H_1$.

Referring back to FIG. 1, in some demonstrative embodiments, devices 102 and/or 140 may be configured to communicate according to a space-time transmit encoding scheme, which may be configured based on the transmit diversity scheme of FIG. 3, for example, for 2×N OFDM MIMO communication, e.g., as described below.

In some demonstrative embodiments, a diversity scheme, which may be configured, for example, for OFDM modulation, may be applied, for example, in a frequency domain, for example, by repetition mapping to subcarriers, e.g., as described below.

Figure 4:
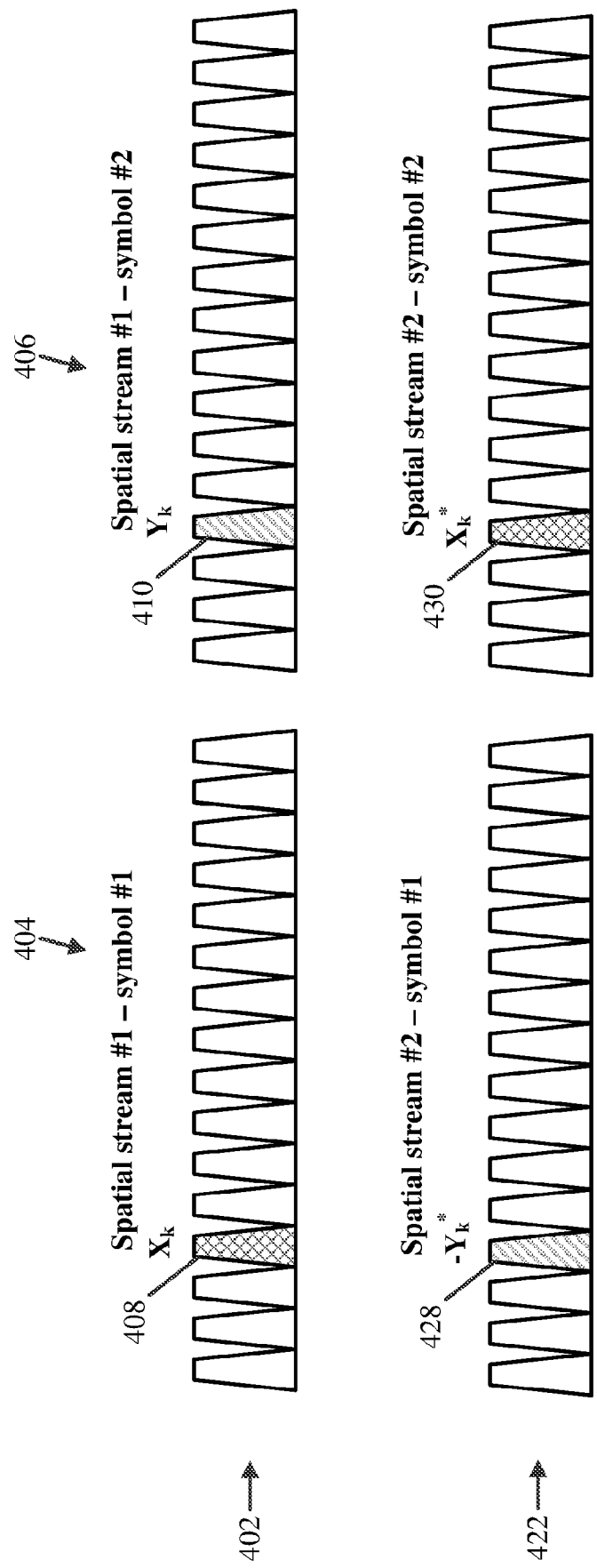
FIG. 4 is a schematic illustration of a mapping of symbols to subcarriers, in accordance with some demonstrative embodiments.

Reference is made to FIG. 4, which schematically illustrates a mapping scheme 400 to map symbols to subcarriers, in accordance with some demonstrative embodiments. For example, devices 102 and/or 140 (FIG. 1) may be configured to communicate an OFDM MIMO transmission according to the mapping scheme of FIG. 4.

In some demonstrative embodiments, as shown in FIG. 4, a symbol, denoted $X_k$, may be mapped to a subcarrier with an index k, e.g., subcarrier 408, of an OFDM symbol 404, denoted symbol #1, in a spatial stream 402, denoted stream #1; a symbol, denoted $Y_k$, may be mapped to a subcarrier with an index k, e.g., subcarrier 410, of a subsequent OFDM symbol 406, denoted symbol #2, in spatial stream 402; the symbol $Y_k$ with coding, denoted $-Y_k^*$, e.g., with sign inversion and complex conjugation, may be mapped to a subcarrier with an index k, e.g., subcarrier 428, of the OFDM symbol 404, in a spatial stream 422, denoted stream #2; and the symbol $X_k$ with coding, denoted $X_k^*$, e.g., with complex conjugation, may be mapped to a subcarrier with an index k, e.g., subcarrier 430, of the subsequent OFDM symbol 406, in spatial stream 422, e.g., as described below.

In some demonstrative embodiments, it may be assumed that the channel per subcarrier does not change, for example, due to the stationary property of the channel in a directional frequency band, e.g., the 60 GHz band. Accordingly, at a receiver side, an optimal combining technique, e.g., in accordance with an Alamouti combining technique, may be applied, for example, to create diversity gain and/or cancel out inter stream interference.

Referring back to FIG. 1, in some demonstrative embodiments a wireless device, e.g., devices 102 and/or 140, may be configured to communicate according to a space-time transmit encoding scheme, which may define a mapping of subcarriers to a plurality of spatial streams, e.g., to two spatial streams or any other number of spatial streams, for example, for an OFDM MIMO transmission.

In some demonstrative embodiments, devices 102 and/or 140 may be configured to generate, transmit, receive and/or process one or more OFDM MIMO transmissions according to the space-time transmit encoding scheme, e.g., as described below.

In some demonstrative embodiments, devices 102 and/or 140 may be configured to utilize a pilot mapping scheme, which may be configured according to the space-time transmit encoding scheme, e.g., as described below.

In some demonstrative embodiments, devices 102 and/or 140 may be configured to communicate according to a pilot structure, which may be configured for an OFDM MIMO transmission with the space-time transmit encoding scheme, e.g., an STBC scheme, an Alamouti scheme and/or any other space-time diversity scheme.

In some demonstrative embodiments, devices 102 and/or 140 may be configured to generate, transmit, receive and/or process one or more OFDM MIMO transmissions according to a pilot sequence definition, which may be configured, for example, for an OFDM STBC scheme, e.g., as described below.

In some demonstrative embodiments, devices 102 and/or 140 may be configured to generate, transmit, receive and/or process one or more OFDM MIMO transmissions according to a pilot sequence definition, which may be configured, for example, for STBC for OFDM PHY, for example, for implementation in a future IFFE 802.11ay Specification, e.g., as described below.

In some demonstrative embodiments, devices 102 and/or 140 may be configured to implement one or more pilot sequences, which may be configured, for example, for a channel bonding transmission, for example, for a number of space-time streams equal to two. In other embodiments, the pilot sequences may be implemented for any other transmission.

In some demonstrative embodiments, the pilot sequence may be configured, for example, to support a technical solution, which may, for example, allow SISO and/or MIMO channel estimation and/or tracking, common phase error estimation, sampling frequency estimation, phase noise realization estimation, and/or one or more other additional or alternative capabilities and/or benefits.

In some demonstrative embodiments, the pilot sequence may be configured, for example, to support applying an STBC scheme for pilots, e.g., in addition to data subcarriers.

In some demonstrative embodiments, devices 102 and/or 140 may be configured to generate, transmit, receive and/or process one or more transmissions including an OFDM STBC pilot sequence, for example, for EDMG OFDM PHY, e.g., as described below.

In some demonstrative embodiments, devices 102 and/or 140 may be configured to generate, transmit, receive and/or process one or more transmissions, for example, by performing single spatial stream to two space-time streams mapping for data and/or pilot subcarrier mapping, e.g., as described below.

In some demonstrative embodiments, devices 102 and/or 140 may be configured to utilize a pilot mapping scheme including a structure of 16 pilots per OFDM symbol, e.g., as described below. In other embodiments, devices 102 and/or 140 may be configured to utilize a mapping scheme including a structure of any other number of pilots per OFDM symbol.

In some demonstrative embodiments, devices 102 and/or 140 may be configured to utilize a pilot mapping scheme including a pilot structure of 16 pilots per OFDM symbol, which may be, for example, spanned equidistantly in the frequency domain over the entire signal bandwidth, e.g., as described below.

In some demonstrative embodiments, the pilot structure may be utilized, for example, in a future standard, for example, an IFEE 802.11ay Standard and/or any other standard.

In some demonstrative embodiments, a pilot structure, for example, which may be configured in compliance with a legacy pilot structure, e.g., of an IEEE 802.11ad Standard, may be reused, e.g., combined with, a space-time signal structure, for example, in accordance with an Alamouti technique or any other space-time diversity scheme, which may be configured, for example, at least to allow to combine signals, to cancel out inter stream interference, and/or to combine channel gain.

In some demonstrative embodiments, devices 102 and/or 140 may be configured to communicate according to a pilot structure, which may be configured, for example, to allow applying a space-time diversity scheme, e.g., an Alamouti demodulation approach, to cancel out inter stream interference, and/or to combine a diversity gain from a channel existing between M Transmit (Tx) antennas, e.g., 2 Tx antennas, and N Receive (Rx) antennas.

In some demonstrative embodiments, devices 102 and/or 140 may be configured to communicate according to a pilot structure, which may be configured, for example, in accordance with on an OFDM pilot structure, e.g., as described below. In other embodiments, the pilot structure may be configured based, on, in accordance with, and/or in compliance with, any other additional or alternative symbol and/or pilot structure, configuration and/or scheme.

In some demonstrative embodiments, for an OFDM symbol with an index n (in time), a pilot sequence P (also referred to as "the original pilot sequence") may be multiplied by a value $2 \times p_n - 1$, wherein $p_n$ denotes a value generated by a shift register of a random generator (scrambler).

Figure 5:
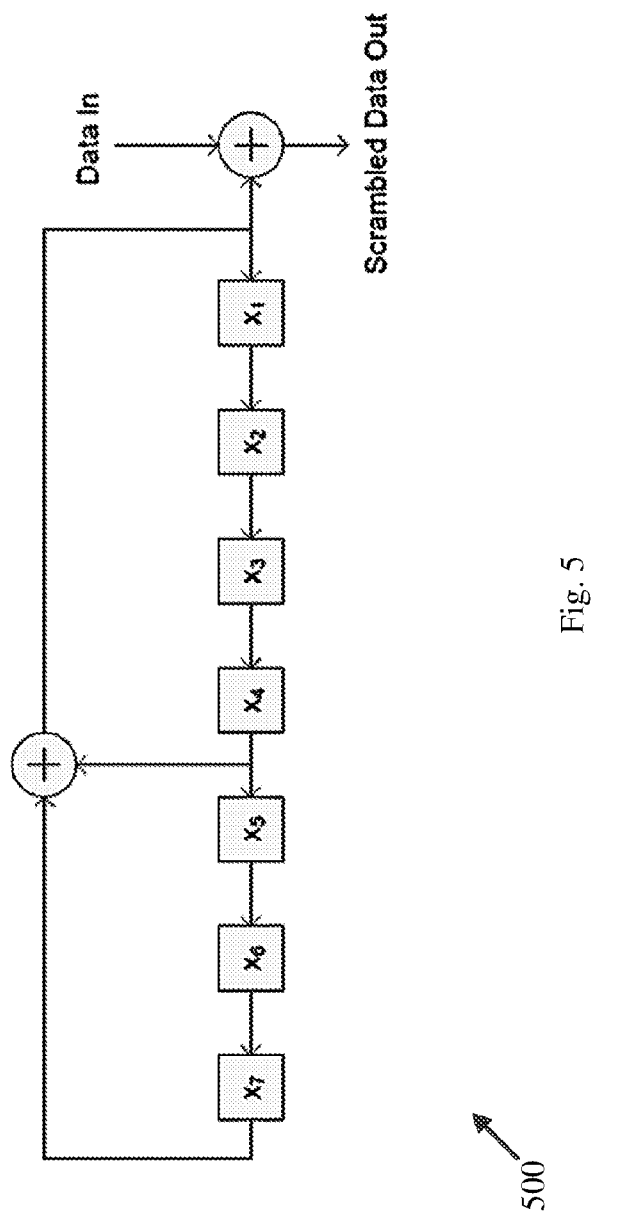
FIG. 5 is a schematic illustration of a random generator, which may be implemented to generate a value to be applied to a pilot sequence, in accordance with some demonstrative embodiments.

Reference is made to FIG. 5, which schematically illustrates a random generator (scrambler) 500, which may be implemented to generate a value to be applied to a pilot sequence, in accordance with some demonstrative embodiments.

In some demonstrative embodiments, devices 102 and/or 140 (FIG. 1) may be configured to implement random generator 500 to generate the value of $p_n$.

In other embodiments, any other additional or alternative random generator scheme may be implemented.

In some demonstrative embodiments, as shown in FIG. 5, random generator 500 may be configured to generate a periodic sequence, e.g., of length 127 or any other length, for example, based on the polynomial $x^7 + x^4 + 1$, for example, based on a plurality of bit values, denoted x1, x2, . . . , x7.

In other embodiments, random generator 500 may be configured to generate a periodic sequence based on any other polynomial.

In some demonstrative embodiments, the plurality of bit values x1, x2, . . . , x7 may all be set to a value of "1", e.g., at a first OFDM symbol.

In some demonstrative embodiments, the pilot sequence may change the sign to inverse one, for example, if the value of $2 \times p_n - 1$ is equal to (−1).

Referring back to FIG. 1, in some demonstrative embodiments, devices 102 and/or 140 may be configured to utilize an OFDM pilot structure, which may be configured to support an OFDM MIMO transmission, e.g., according to a 2×N OFDM MIMO scheme, with a space-time encoding scheme, e.g., an STBC scheme, exploiting 2 transmit antennas and N receive antennas, e.g., as described below.

In some demonstrative embodiments, the OFDM pilot structure may be configured to support spatial signal processing at a receiver side, e.g., as described below.

In some demonstrative embodiments, devices 102 and/or 140 may be configured to communicate an OFDM MIMO transmission, e.g., according to the diversity scheme described above with reference to FIGS. 3 and/or 4, for example, using a pilot structure, which may be configured, for example, for OFDM MIMO with a space-time diversity scheme, e.g., as described below.

In some demonstrative embodiments, controller 124 may be configured to cause, trigger, and/or control a wireless station, e.g., a DMG STA or an EDMG STA, implemented by device 102 to generate and transmit an OFDM MIMO transmission to at least one other station, for example, a station implemented by device 140, e.g., as described below.

In some demonstrative embodiments, controller 124 may include, operate as, and/or perform the functionality of a mapper 129, which may be configured to map a plurality of data symbols to OFDM symbols in a plurality of spatial streams, for example, according to a space-time diversity encoding scheme, e.g., as described below.

In some demonstrative embodiments, mapper 129 may be configured to map the data symbols to the OFDM symbols according to a space-time diversity mapping scheme, for example, an STBC diversity scheme, an Alamouti-based diversity scheme and/or any other space-time diversity scheme, for example, as described above with reference to FIGS. 3 and/or 4, and/or according to any other space-time diversity scheme.

In some demonstrative embodiments, mapper 129 may be configured to map a plurality of modulated pilot sequences to the OFDM symbols according to a pilot mapping scheme, which may be configured, for example, to support the space-time encoding scheme, e.g., as described below.

In some demonstrative embodiments, the pilot mapping scheme may be configured to map the plurality of modulated pilot sequences to a pair of OFDM symbols in first and second spatial streams, for example, with repetition coding, e.g., as described below.

In some demonstrative embodiments, the plurality of modulated pilot sequences may be based on a pair of pilot sequences, e.g., as described below.

In some demonstrative embodiments, the pilot mapping scheme may include a first modulated pilot sequence mapped to a first spatial (space-time) stream and a second modulated pilot sequence mapped to a second spatial (space-time) stream, e.g., as described below.

In some demonstrative embodiments, the first modulated pilot sequence may include a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, e.g., as described below.

For example, mapper 129 may be configured to map the first pilot sequence to the plurality of subcarriers of the first plurality of OFDM symbols in the first spatial stream, and to map the second pilot sequence to the plurality of subcarriers of the second plurality of OFDM symbols in the first spatial stream, e.g., as described below.

In some demonstrative embodiments, the second modulated pilot sequence may include the second pilot sequence with sign inversion mapped to the plurality of subcarriers of the first plurality of OFDM symbols in the second spatial stream, and the first pilot sequence mapped to the plurality of subcarriers of the second plurality of OFDM symbols in the second spatial stream, e.g., as described below.

For example, mapper 129 may be configured to map the second pilot sequence with sign inversion to the plurality of subcarriers of the first plurality of OFDM symbols in the second spatial stream, and to map the first pilot sequence to the plurality of subcarriers of the second plurality of OFDM symbols in the second spatial stream, e.g., as described below.

In some demonstrative embodiments, the first plurality of OFDM symbols may include even-numbered OFDM symbols, and the second plurality of OFDM symbols may include odd-numbered OFDM symbols, e.g., as described below.

In some demonstrative embodiments, controller 124 may include, operate as, and/or perform the functionality of a pilot sequence generator 127, which may be configured to generate a plurality of pilot sequences to be mapped by mapper 129, e.g., as described below. For example, pilot sequence generator 127 may be configured to generate the plurality of pilot sequences utilizing a random generator (scrambler), for example, random generator 500 (FIG. 5), e.g., as described above.

In some demonstrative embodiments, pilot sequence generator 127 may be configured to generate a pilot sequence, e.g., the first and/or second pilot sequences, including, for example, sixteen pilot subcarriers or any other number of pilot subcarriers.

In some demonstrative embodiments, pilot sequence generator 127 may be configured to generate the pilot sequence including sixteen evenly spaced pilot subcarriers. In other embodiments, pilot sequence generator 127 may be configured to generate at least one pilot sequence having any other number of pilot subcarriers, which are not evenly spaced.

In some demonstrative embodiments, pilot sequence generator 127 may be configured to generate the pilot sequence, for example, such two adjacent pilot subcarriers of the pilot sequence, e.g., each pair of adjacent sub-carriers, are 20 subcarriers apart. In other embodiments, the pilot sequence may include pilot sub-carriers spaced by any other constant or varying number of subcarriers.

In some demonstrative embodiments, pilot sequence generator 127 may be configured to generate a pilot sequence having an index n, for example, by applying to a predefined pilot sequence, denoted P, a function, which is based on a value of n.

In some demonstrative embodiments, pilot sequence generator 127 may be configured to generate the pilot sequence having the index n, for example, by multiplying the pilot sequence P by the value $2 \times p_n - 1$.

For example, a pilot sequence having an index n, which may be applied to an OFDM symbol with the index n, may be generated, for example, by multiplying the pilot sequence P by the value of $2 \times p_n - 1$. For example, the value of $p_n$ may be determined by the random generator 500 (FIG. 5), e.g., as described above.

In some demonstrative embodiments, mapper 129 may be configured to map the first pilot sequence to the plurality of subcarriers of the first plurality of OFDM symbols in the first spatial stream based on a first scrambler bit, e.g., as described below.

For example, the first scrambler bit, denoted $2p_{2n} - 1$, may correspond to the even-numbered OFDM symbols.

In some demonstrative embodiments, mapper 129 may be configured to map the second pilot sequence to the plurality of subcarriers of the second plurality of OFDM symbols in the first spatial stream based on a second scrambler bit, e.g., as described below.

For example, the second scrambler bit, denoted $2p_{2n+1} - 1$, may correspond to the odd-numbered OFDM symbols.

In some demonstrative embodiments, mapper 129 may be configured to map the sign inversion of the second pilot sequence to the plurality of subcarriers of the first plurality of OFDM symbols in the second spatial stream based on the first scrambler bit, e.g., as described below.

In some demonstrative embodiments, mapper 129 may be configured to map the first pilot sequence to the plurality of subcarriers of the second plurality of OFDM symbols in the second spatial stream based on the second scrambler bit, e.g., as described below.

In some demonstrative embodiments, the values of the first and second scrambler bits may be generated by random generator 500 (FIG. 5), e.g., as described above.

In other embodiments, the values of the first and second scrambler bits may be determined in any other way.

In some demonstrative embodiments, the mapping of the first and second pilot sequences may include repetition without applying complex conjugation, for example, if the pilot sequences include one or more complex values, e.g., as described above.

In some demonstrative embodiments, the mapping of the first and second pilot sequences may include applying a complex conjugation for the repetition of the pilot sequences, for example, if the pilot sequences include one or more complex values, e.g., as described below.

In some demonstrative embodiments, mapper 129 may be configured to map a sign inversion complex conjugate of the second pilot sequence to the plurality of subcarriers of the first plurality of OFDM symbols in the second spatial stream, e.g., as described below.

In some demonstrative embodiments, mapper 129 may be configured to map a complex conjugate of the first pilot sequence to the plurality of subcarriers of the second plurality of OFDM symbols in the second spatial stream, e.g., as described below.

In some demonstrative embodiments, the first and second pilot sequences may include mutually orthogonal sequences, e.g., as described below.

In some demonstrative embodiments, each of the first and second pilot sequences may include sixteen pilot subcarriers, e.g., as described below.

In other embodiments, the first and/or second pilot sequences may include any other number of pilot subcarriers.

In one example, each of the first and second pilot sequences may have a length of 36, 56, or 76 subcarriers, e.g., as described below.

In some demonstrative embodiments, the first and/or second pilot sequences may include evenly spaced pilot subcarriers, e.g., as described below.

In some demonstrative embodiments, two adjacent pilot subcarriers may be 20 subcarriers apart, e.g., as described below.

In other embodiments, two adjacent pilot subcarriers may be spaced in any other way and/or by any other number of subcarriers.

In some demonstrative embodiments, the first and/or second pilot sequences may include symbol values of ±1, e.g., as described below.

In other embodiments, the first and/or second pilot sequences may include any additional or alternative symbol values.

In one example, the first and/or second pilot sequences may include complex values, e.g., symbol values of (+j, −j).

In some demonstrative embodiments, a length of each of the first and/or second pilot sequences, denoted $N_{SP}$, may be based on a channel bonding factor, e.g., as described below. In other embodiments, the length of the first and/or second pilot sequences may be based on any other additional or alternative parameter or attribute.

For example, the number $N_{SP}$ of pilot subcarriers in the pilot sequence may depend, for example, on a channel bonding factor, denoted $N_{CB}$, and/or on one or more additional or alternative attributes.

In some demonstrative embodiments, for example, for channel bonding factors $N_{CB}$=1, 2, 3, and/or 4, the value of $N_{SP}$ may be, for example, 16, 36, 56, and/or 76, respectively. In other embodiments, other values of $N_{SP}$ may be used and/or values of $N_{SP}$ may be defined for additional or alternative channel bonding factors.

For example, the length of 16 subcarriers may correspond to a channel bonding factor of 1, the length of 36 subcarriers may correspond to a channel bonding factor of 2, the length of 56 subcarriers may correspond to a channel bonding factor of 3, and/or the length of 76 subcarriers may correspond to a channel bonding factor of 4, e.g., as described below.

In some demonstrative embodiments, for example, in case of $N_{CB}$=1, the pilot sequences may be defined, e.g., as follows:

TABLE 1

Pilot sequences $P_{16}$ ($i_{STS}$, :) definition

| $i_{STS}$ | $P_{16}$ ($i_{STS}$, :) |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |

For example, the first pilot sequence may include the sequence [+1+1+1−1+1+1−1+1+1+1+1−1−1−1+1−1], and/or the second pilot sequence may include the sequence [−1−1−1+1−1−1+1−1+1+1+1−1−1−1+1−1], e.g., as described below.

In other embodiments, any other additional or alternative pilot sequences may be implemented In one example, the sequences $P_{NSP}(i_{STS}, :)$ may be defined, e.g., in a general case, to include any mutually orthogonal sequences.

In some demonstrative embodiments, controller 124 may be configured to cause, trigger, and/or control the wireless station implemented by device 102 to transmit an OFDM MIMO transmission based on the plurality of spatial streams.

In some demonstrative embodiments, controller 124 may be configured to cause, trigger, and/or control the wireless station implemented by device 102 to transmit the plurality of spatial streams via a plurality of directional antennas, e.g., as described below.

In some demonstrative embodiments, the OFDM MIMO transmission may include a 2×N OFDM MIMO transmission, e.g., as described below. In other embodiments, the MIMO transmission may include any other M×N MIMO transmission.

In some demonstrative embodiments, the OFDM MIMO transmission may include a 2×N OFDM MIMO transmission including two spatial transmit streams via two respective antennas, e.g., as described below.

For example, controller 124 may be configured to cause, trigger, and/or control the wireless station implemented by device 102 to transmit the first spatial stream via a first antenna of antennas 107, and to transmit the second spatial stream via a second antenna of antennas 107.

In some demonstrative embodiments, controller 124 may be configured to cause, trigger, and/or control the wireless station implemented by device 102 to transmit the OFDM MIMO transmission over a frequency band above 45 GHz.

In some demonstrative embodiments, controller 124 may be configured to cause, trigger, and/or control the wireless station implemented by device 102 to transmit the OFDM MIMO transmission over a channel bandwidth of at least 2.16 GHz.

In other embodiments, controller 124 may be configured to cause, trigger, and/or control the wireless station implemented by device 102 to transmit the OFDM MIMO transmission over a channel bandwidth of 4.32 GHz, 6.48 GHz, or 8.64 GHz, or any other channel bandwidth.

Figure 6:
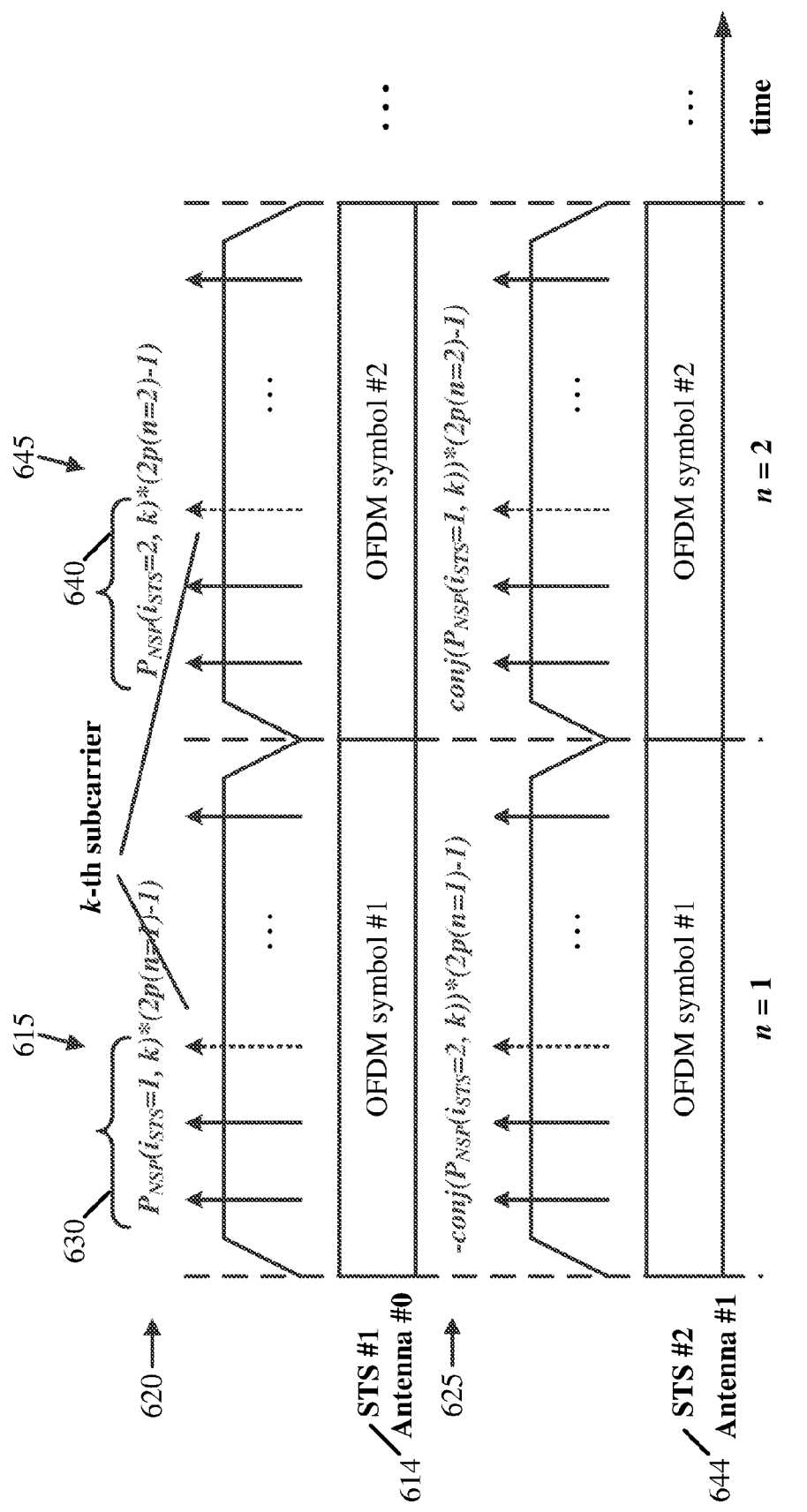
FIG. 6 is a schematic illustration of a pilot mapping scheme, in accordance with some demonstrative embodiments.

Reference is made to FIG. 6, which schematically illustrates pilot mapping scheme 600, in accordance with some demonstrative embodiments. For example, a wireless station, e.g., a wireless station implemented by device 102 (FIG. 1), may be configured to map modulated pilot sequences to a plurality of spatial streams according to pilot mapping scheme 600, e.g., as described below. In one example, controller 124 (FIG. 1), pilot sequence generator 127 (FIG. 1) and/or mapper 129 (FIG. 1), may be configured to cause, trigger, and/or control the wireless station implemented by device 102 (FIG. 1) to map modulated pilot sequences to be transmitted in an OFDM MIMO transmission according to pilot mapping scheme 600.

In some demonstrative embodiments, pilot mapping scheme 600 may utilize a pilot signal structure in a frequency domain, which may be configured to support pilot mapping for a 2×N OFDM MIMO transmission, e.g., to support an implementation in accordance with an IEEE 802.11ay Specification.

In some demonstrative embodiments, pilot mapping scheme 600 may be configured to map a first modulated pilot sequence, e.g., a modulated pilot sequence 620, to a first spatial (space-time) stream, e.g., a spatial stream 614, and to map a second modulated pilot sequence, e.g., a modulated pilot sequence 625, to a second spatial (space-time) stream, e.g., a spatial stream 644.

In one example, spatial stream 614 may include OFDM symbols of stream 402 (FIG. 4), and/or spatial stream 644 may include OFDM symbols of stream 422 (FIG. 4). For example, OFDM symbol 615 may include OFDM symbol 404 (FIG. 4), and/or OFDM symbol 645 may include symbol 406 (FIG. 4).

In some demonstrative embodiments, modulated pilot sequence 620 may include a first pilot sequence, e.g., a pilot sequence 630, mapped to a plurality of subcarriers of a first plurality of OFDM symbols in spatial stream 614 and a second pilot sequence, e.g., a pilot sequence 640, mapped to a plurality of subcarriers of a second plurality of OFDM symbols in spatial stream 614, e.g., as described below.

In some demonstrative embodiments, as shown in FIG. 6, pilot sequence 630, denoted $P_{N_{Sp}}(i_{STS}=1)$ and pilot sequence 640, denoted $P_{N_{Sp}}(i_{STS}=2)$, may be mapped to subcarriers of the OFDM symbols 615 and 645 of the spatial streams 614 and 644, e.g., as described below.

In some demonstrative embodiments, as shown in FIG. 6, pilot mapping scheme 600 may be configured to map pilot sequence 630 to subcarriers of OFDM symbol 615 in spatial stream 614 based on a first scrambler bit, denoted 2p(n)−1, having a first index, e.g., n=1, and to map second pilot sequence 640 to subcarriers of OFDM symbol 645 in spatial stream 614 based on a second scrambler bit, denoted 2p(n)−1, having a second index, e.g., n=2, subsequent to the first index, e.g., as described below.

In one example, the first modulated pilot sequence $P(i_{STS}=1)$ for the first spatial stream 614 may be determined, e.g., as follows:

$$P(i_{STS}=1,2n,k)=P_{N_{SP}}(i_{STS}=1,k)\cdot(2p(2n)-1)$$

$$P(i_{STS}=1,2n+1,k)=P_{N_{SP}}(i_{STS}=2,k)\cdot(2p(2n+1)-1) \quad (1)$$

wherein $i_{STS}$ denotes a space-time stream index (number); n denotes an OFDM symbol index (number), for example, wherein n=0, 1, . . . , $N_{SYM}/2-1$, and $N_{SYM}$ denotes the total number of OFDM symbols; k denotes a pilot subcarrier index (number) of a pilot sequence to be mapped to the OFDM symbol, for example, wherein k=0, 1, . . . , $N_{SP}-1$, and $N_{SP}$ denotes a total number of pilot subcarriers in the pilot sequence; $P_{N_{SP}}(i_{STS})$ denotes a pilot sequence corresponding to a $i_{STS}$-th space-time stream; p(n) denotes a bit coming from a scrambler, e.g., in accordance with Section 20.5.3.2.2 of IEEE 802.11-2016 or any other scrambler, for example, with a shift register $x_1, x_2, \ldots, x_7$ initialized to all ones for the n=0 OFDM symbol, or any other scrambler scheme.

In another example, the first modulated pilot sequence $P(i_{STS}=1)$ may be determined, e.g., as follows:

$$P(i_{STS}=1,2n,M_p(k))=P_{N_{SP}}(i_{STS}=1,k)\cdot(2p(2n)-1)$$

$$P(i_{STS}=1,2n+1,M_p(k))=P_{N_{SP}}(i_{STS}=2,k)\cdot(2p(2n+1)-1) \quad (2)$$

wherein $M_p(k)$ denotes a mapped pilot subcarrier index (number) corresponding to the pilot subcarrier k, for example, according to a mapping scheme for mapping pilot subcarriers of the pilot sequence to subcarriers of an OFDM symbol In some demonstrative embodiments, modulated pilot sequence 625 may include a sign inversion of pilot sequence 640 mapped to a plurality of subcarriers of the first plurality of OFDM symbols in spatial stream 644, and pilot sequence 630 mapped to the plurality of subcarriers of the second plurality of OFDM symbols in spatial stream 644, e.g., as described below.

In some demonstrative embodiments, as shown in FIG. 6, pilot mapping scheme 600 may be configured to map a sign inversion complex conjugate of pilot sequence 640 to subcarriers of OFDM symbol 615 in spatial stream 644 based on the first scrambler bit, and to map a complex conjugate of pilot sequence 630 to subcarriers of OFDM symbol 645 in spatial stream 644 based on the second scrambler bit, e.g., as described below.

In one example, the second modulated pilot sequence $P(i_{STS}=2)$ may be determined, e.g., as follows:

$$P(i_{STS}=2,2n,k)=-\text{conj}(P_{N_{SP}}(i_{STS}=2,k)\cdot(2p(2n)-1))$$

$$P(i_{STS}=2,2n+1,k)=\text{conj}(P_{N_{SP}}(i_{STS}=1,k)\cdot(2p(2n+1)-1)) \quad (3)$$

wherein conj( ) denotes a complex conjugation operation.

In another example, the second modulated pilot sequence $P(i_{STS}=2)$ may be determined, for example, without applying complex conjugation to the pilot symbols, for example, when the pilot sequences do not include complex values, e.g., as follows:

$$P(i_{STS}=2,2n,M_p(k))=-P_{N_{SP}}(i_{STS}=2,k)\cdot(2p(2n)-1)$$

$$P(i_{STS}=2,2n+1,M_p(k))=P_{N_{SP}}(i_{STS}=1,k)\cdot(2p(2n+1)-1) \quad (4)$$

In some demonstrative embodiments, pilot sequences 630 and/or 640 may be generated, for example, by pilot sequence generator 127 (FIG. 1), e.g., as described above.

In some demonstrative embodiments, as shown in FIG. 6, the pilot sequences 630 and 640 may be mapped to two respective subsequent OFDM symbols in time, e.g., the OFDM symbols 615 and 645, and to a same spatial stream, e.g., spatial stream 614, corresponding to a Tx antenna, denoted Antenna #0, e.g., as described below.

In some demonstrative embodiments, a repetition of the pilot sequences 630 and/or 640 may be mapped to two respective subsequent OFDM symbols in time, e.g., the OFDM symbols 615 and 645, and to a same spatial stream, e.g., spatial stream 644, corresponding to a Tx antenna, denoted Antenna #1, e.g., as described below.

In some demonstrative embodiments, as shown in FIG. 6, for OFDM symbol 615, e.g., the OFDM symbol #1 in FIG. 6, pilot sequence 640 may be, for example, repeated in spatial stream 644 with sign inversion and complex conjugation, and for OFDM symbol 645, e.g., the OFDM symbol #2 in FIG. 6, pilot sequence 630 may be, for example, repeated in spatial stream 644 with complex conjugation.

In some demonstrative embodiments, pilot sequences 630 and 640 may include mutually orthogonal sequences.

In other embodiments, pilot sequences 630 and 640 may include any other sequences.

In some demonstrative embodiments, each of pilot sequences 630 and/or 640 may include sixteen pilot subcarriers.

For example, pilot sequence 630 may include the sequence [+1+1+1−1+1+1−1+1+1+1+1−1−1−1+1−1], and/or pilot sequence 640 may include the sequence [−1−1−1+1−1−1+1−1+1+1+1−1−1−1+1−1].

In some demonstrative embodiments, pilot subcarriers of pilot sequences 630 and 640 may be evenly spaced.

In some demonstrative embodiments, two adjacent pilot subcarriers of pilot sequences 630 and 640 may be 20 subcarriers apart.

In other embodiments, each of pilot sequences 630 and/or 640 may include any other number of pilot subcarriers spaced in any other way.

In some demonstrative embodiments, a length of each of pilot sequences 630 and/or 640 may be based on a channel bonding factor.

For example, each of pilot sequences 630 and/or 640 may include a length of 16, 36, 56, or 76 subcarriers, the length of 16 subcarriers may correspond to a channel bonding factor of 1, the length of 36 subcarriers may correspond to a channel bonding factor of 2, the length of 56 subcarriers may correspond to a channel bonding factor of 3, the length of 76 subcarriers may correspond to a channel bonding factor of 4.

In some demonstrative embodiments, pilot sequences 630 and/or 640 may be mapped to the same subcarrier indexes.

In other embodiments, sequences 630 and 640 may be mapped to different subcarrier indexes.

In some demonstrative embodiments, as shown in FIG. 6, pilot subcarriers of pilot sequences 630 and/or 640 may be mapped to pilot subcarriers between data subcarriers of spatial streams 614 and/or 644.

In one example, OFDM symbol 615 may include the data subcarriers of OFDM symbol 404 (FIG. 4), and/or OFDM symbol 645 may include the data subcarriers of OFDM symbol 406 (FIG. 4). For example, OFDM symbol 615 in spatial stream 614 may include pilot subcarriers of pilot sequence 630 and data subcarriers 408 (FIG. 4), OFDM symbol 615 in spatial stream 644 may include a sign inversion and complex conjugation of pilot subcarriers of pilot sequence 640 and data subcarriers 428 (FIG. 4), OFDM symbol 645 in spatial stream 614 may include pilot subcarriers of pilot sequence 640 and data subcarriers 410 (FIG. 4), and/or OFDM symbol 645 in spatial stream 644 may include pilot subcarriers of a complex conjugate of pilot sequence 630 and data subcarriers 430 (FIG. 4).

In some demonstrative embodiments, it may not be required to apply complex conjugation to the pilot symbols, for example, when the pilot sequences include real value symbols, e.g. symbol values of +1.

Referring back to FIG. 1, in some demonstrative embodiments, controller 154 may be configured to cause, trigger, and/or control a wireless station implemented by device 140 to process an OFDM MIMO transmission received from another station, for example, the station implemented by device 102, e.g., as described below.

In some demonstrative embodiments, the received OFDM MIMO transmission may include a plurality of spatial (space-time) streams, e.g., as described above.

In some demonstrative embodiments, controller 154 may be configured to cause, trigger, and/or control the wireless station implemented by device 140 to process the received OFDM MIMO transmission, for example, in accordance with a diversity mapping scheme, for example, the mapping scheme 300 (FIG. 3) and/or the pilot mapping scheme 600 (FIG. 6), e.g., as described below.

In some demonstrative embodiments, controller 154 may include, operate as, and/or perform the functionality of a demodulator 157, which may be configured to process the plurality of spatial streams to demodulate the OFDM MIMO transmission, e.g., as described below.

In some demonstrative embodiments, demodulator 157 may be configured to demodulate the pilot signals from the OFDM MIMO transmission, for example, according to the pilot mapping scheme 600 (FIG. 6), e.g., as described below.

In some demonstrative embodiments, the pilot mapping scheme, e.g., the pilot mapping scheme 600 (FIG. 6), may include a first modulated pilot sequence, e.g., modulated sequence 620 (FIG. 6), mapped to a first spatial stream, e.g., spatial stream 614 (FIG. 6) and a second modulated pilot sequence, e.g., modulated sequence 625 (FIG. 6), mapped to a second spatial stream, e.g., spatial stream 644 (FIG. 6), the first modulated pilot sequence including a first pilot sequence, e.g., pilot sequence 630 (FIG. 6), mapped to a plurality of subcarriers of a first plurality of OFDM symbols in the first spatial stream and a second pilot sequence, e.g., pilot sequence 640, mapped to a plurality of subcarriers of a second plurality of OFDM symbols in the first spatial stream, the second modulated pilot sequence including a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream, e.g., as described above.

In some demonstrative embodiments, at the receiver side, e.g., at device 140, a space-time demodulation technique, e.g., based on an Alamouti demodulation technique, may be used, for example, to combine a plurality of pilot signals for the same subcarrier with an index k and a plurality of OFDM symbols from the first and second spatial streams, for example, in accordance with the mapping scheme 600 (FIG. 6).

In some demonstrative embodiments, the received pilot signals at a time, denoted t, and a subsequent time, denoted t+T, may be represented, for example, as follows:

$$r_0 = r(t) = H_0 S_0 + H_1 S_1 + n_0$$

$$r_1 = r(t+T) = H_0(-S_1^*) + H_1(S_0^*) + n_1 \quad (5)$$

wherein $n_0$ and $n_1$ denote noise samples, and $S_0$ and $S_1$ denote transmitted pilot signals from the respective modulated pilot sequences $P(i_{STS}=1)$ and $P(i_{STS}=2)$.

In some demonstrative embodiments, first and second estimated pilot signals, denoted $\tilde{S}_0$ and $\tilde{S}_1$, may be determined, for example, as follows:

$$\tilde{S}_0 = H_0^* r_0 + H_1 r_1^*$$

$$\tilde{S}_1 = H_1^* r_0 - H_0 r_1^* \quad (6)$$

In some demonstrative embodiments, the estimated pilot signals $\tilde{S}_0$ and $\tilde{S}_1$ may be, for example, determined as follows:

$$\Rightarrow \tilde{S}_0 = (|H_0|^2 + |H_1|^2)S_0 + \underbrace{H_0^* H_1 S_1 - H_0^* H_1 S_1}_{=0} + H_1 n_1^* + H_0^* n_0 \quad (7)$$

$$\Rightarrow \tilde{S}_1 = (|H_0|^2 + |H_1|^2)S_1 + \underbrace{H_1^* H_0 S_0 - H_1^* H_0 S_0}_{=0} + H_1^* n_0 - H_0 n_1^*$$

In some demonstrative embodiments, the demodulation scheme described above may combine the channel gain, and/or may cancel out the inter stream components.

In some demonstrative embodiments, the estimated pilot subcarriers may be used, for example, for estimations in a modem receiver chain.

In some demonstrative embodiments, the demodulation scheme may be configured with respect to a transmission received via two receive antennas. In other embodiments, the demodulation scheme may be generalized for any other number of Rx antennas.

Figure 7:
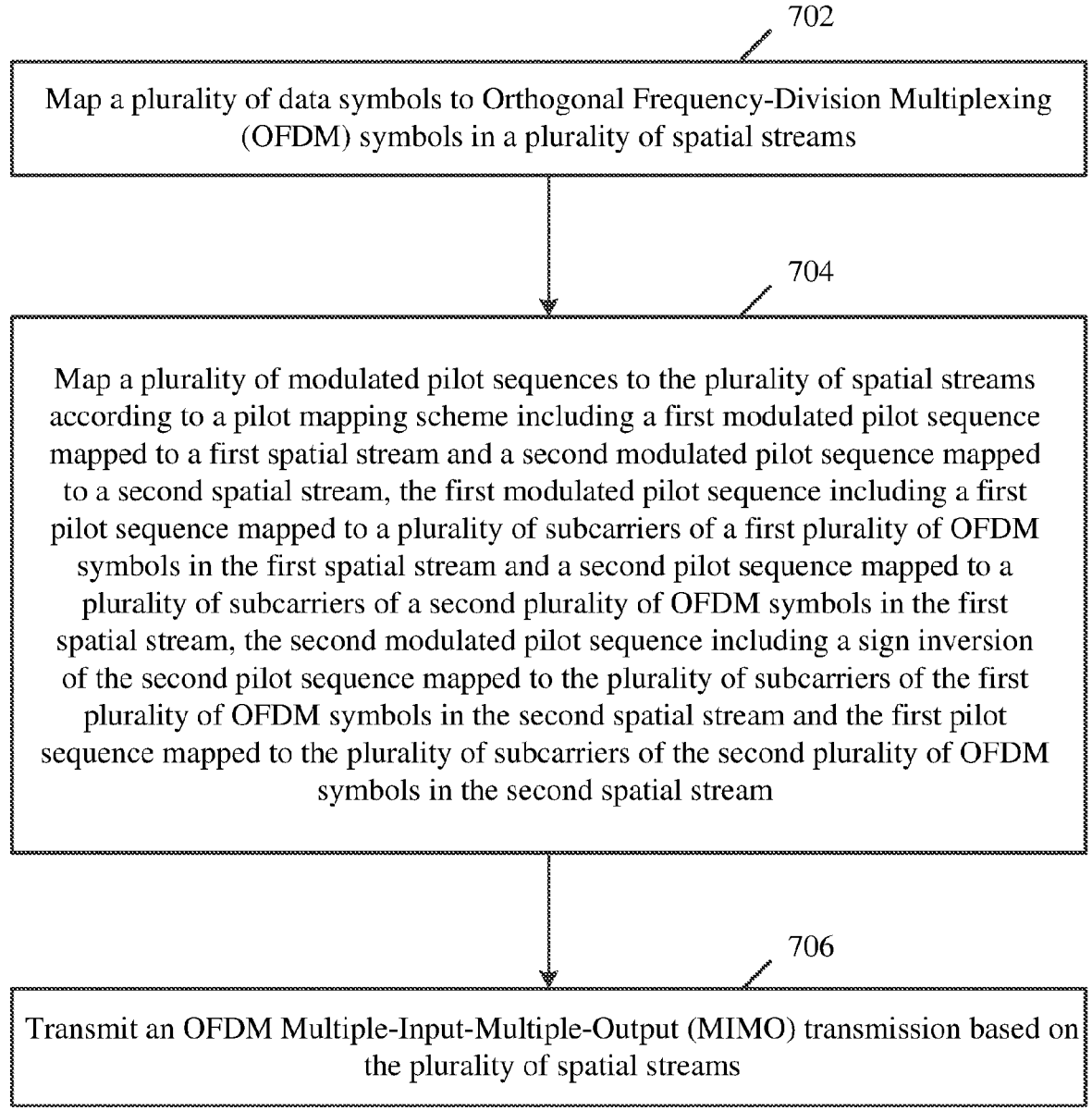
FIG. 7 is a schematic flow-chart illustration of a method of communicating a transmission according to a space-time encoding scheme, in accordance with some demonstrative embodiments.

Reference is made to FIG. 7, which schematically illustrates a method of communicating a transmission according to a space-time encoding scheme, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a mapper, e.g., mapper 129 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include mapping a plurality of data symbols to OFDM symbols in a plurality of spatial streams. For example, mapper 129 (FIG. 1) may be configured to cause, trigger, and/or control the wireless station implemented by device 102 (FIG. 1) to map the plurality of data symbols to OFDM symbols in a plurality of spatial streams, e.g., as described above.

As indicated at block 704, the method may include mapping a plurality of modulated pilot sequences to the OFDM symbols according to a pilot mapping scheme.

In some demonstrative embodiments, the pilot mapping scheme may include a first modulated pilot sequence mapped to a first spatial stream and a second modulated pilot sequence mapped to a second spatial stream, the first modulated pilot sequence including a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence including a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream, e.g., as described above.

For example, mapper 129 (FIG. 1) may be configured to cause, trigger, and/or control the wireless station implemented by device 102 (FIG. 1) to map a plurality of modulated pilot sequences to the OFDM symbols according to pilot mapping scheme 600 (FIG. 6), e.g., as described above.

As indicated at block 706, the method may include transmitting an OFDM MIMO transmission based on the plurality of spatial streams. For example, controller 124 (FIG. 1) may be configured to cause, trigger, and/or control the wireless station implemented by device 102 (FIG. 1) to transmit the OFDM MIMO transmission based on the plurality of spatial streams, e.g., as described above.

Figure 8:
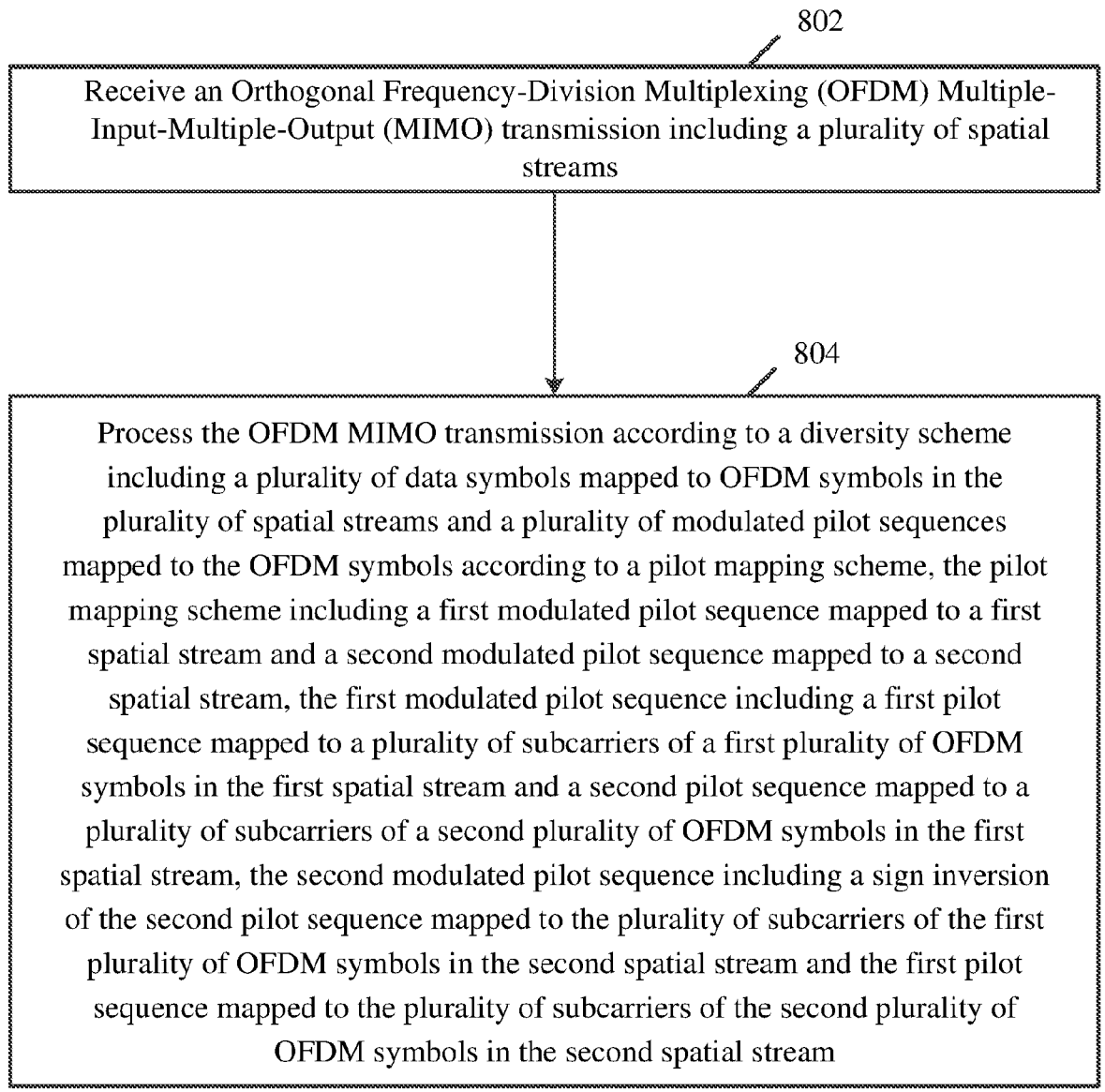
FIG. 8 is a schematic flow-chart illustration of a method of communicating a transmission according to a space-time encoding scheme, in accordance with some demonstrative embodiments.

Reference is made to FIG. 8, which schematically illustrates a method of communicating a transmission according to a space-time encoding scheme, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include receiving an OFDM MIMO transmission including a plurality of spatial streams. For example, controller 154 (FIG. 1) may be configured to cause, trigger, and/or control the wireless station implemented by device 140 (FIG. 1) to receive from device 102 (FIG. 1) the OFDM MIMO transmission including the plurality of spatial streams, e.g., as described above.

As indicated at block 804, the method may include processing the OFDM MIMO transmission according to a diversity scheme including a plurality of data symbols mapped to OFDM symbols in the plurality of spatial streams, and a plurality of pilot sequences mapped to the OFDM symbols according to a pilot mapping scheme.

In some demonstrative embodiments, the pilot mapping scheme may include a first modulated pilot sequence mapped to a first spatial stream and a second modulated pilot sequence mapped to a second spatial stream, the first modulated pilot sequence including a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence including a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream, e.g., as described above.

For example, controller 154 (FIG. 1) may be configured to cause, trigger, and/or control the wireless station implemented by device 140 (FIG. 1) to process the OFDM MIMO transmission according to the diversity scheme 300 (FIG. 3) and the pilot mapping scheme 600 (FIG. 6), e.g., as described above.

Figure 9:
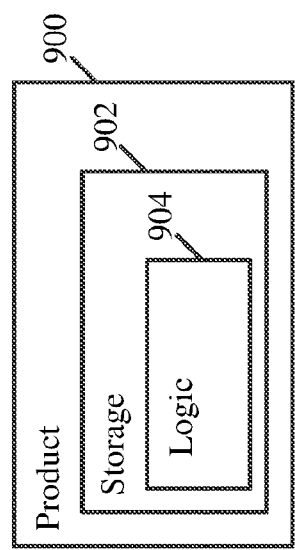
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine readable") non-transitory storage media 902, which may include computer-executable instructions, e.g., implemented by logic 904, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), and/or message processor 158 (FIG. 1) to perform one or more operations, and/or to perform, trigger and/or implement one or more operations, communications and/or functionalities described above with reference to FIGS. 1, 2, 3, 4, 5, 6, 7, and/or 8, and/or one or more operations described herein. The phrase "non-transitory machine-readable medium" is directed to include all computer-readable media, with the sole exception being a transitory propagating signal.

In some demonstrative embodiments, product 900 and/or storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication station (STA) to map a plurality of data symbols to Orthogonal Frequency-Division Multiplexing (OFDM) symbols in a plurality of spatial streams; map a plurality of modulated pilot sequences to the plurality of spatial streams according to a pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream; and transmit an OFDM Multiple-Input-Multiple-Output (MIMO) transmission based on the plurality of spatial streams.

Example 2 includes the subject matter of Example 1, and optionally, wherein the first plurality of OFDM symbols comprises even-numbered OFDM symbols, and the second plurality of OFDM symbols comprises odd-numbered OFDM symbols.

Example 3 includes the subject matter of Example 1 or 2, and optionally, wherein the apparatus is configured to cause the STA to map the first pilot sequence to the plurality of subcarriers of the first plurality of OFDM symbols in the first spatial stream based on a first scrambler bit, to map the second pilot sequence to the plurality of subcarriers of the second plurality of OFDM symbols in the first spatial stream based on a second scrambler bit, to map the sign inversion of the second pilot sequence to the plurality of subcarriers of the first plurality of OFDM symbols in the second spatial stream based on the first scrambler bit, and to map the first pilot sequence to the plurality of subcarriers of the second plurality of OFDM symbols in the second spatial stream based on the second scrambler bit.

Example 4 includes the subject matter of any one of Examples 1-3, and optionally, wherein the apparatus is configured to cause the STA to map a sign inversion complex conjugate of the second pilot sequence to the plurality of subcarriers of the first plurality of OFDM symbols in the second spatial stream, and to map a complex conjugate of the first pilot sequence to the plurality of subcarriers of the second plurality of OFDM symbols in the second spatial stream.

Example 5 includes the subject matter of any one of Examples 1-4, and optionally, wherein the first and second pilot sequences comprise mutually orthogonal sequences.

Example 6 includes the subject matter of any one of Examples 1-5, and optionally, wherein each of the first and second pilot sequences comprises sixteen pilot subcarriers.

Example 7 includes the subject matter of Example 6, and optionally, wherein the sixteen pilot subcarriers are evenly spaced.

Example 8 includes the subject matter of Example 7, and optionally, wherein two adjacent pilot subcarriers are 20 subcarriers apart.

Example 9 includes the subject matter of any one of Examples 6-8, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 10 includes the subject matter of any one of Examples 1-9, and optionally, wherein the first and second pilot sequences comprise symbol values of ±1.

Example 11 includes the subject matter of any one of Examples 1-10, and optionally, wherein a length of each of the first and second pilot sequences is based on a channel bonding factor.

Example 12 includes the subject matter of Example 11, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 13 includes the subject matter of any one of Examples 1-12, and optionally, wherein the OFDM MIMO transmission comprises a 2×N OFDM MIMO transmission comprising two spatial transmit streams via two respective antennas.

Example 14 includes the subject matter of any one of Examples 1-13, and optionally, wherein the apparatus is configured to cause the STA to transmit the OFDM MIMO transmission over a frequency band above 45 Gigahertz (GHz).

Example 15 includes the subject matter of any one of Examples 1-14, and optionally, wherein the apparatus is configured to cause the STA to transmit the OFDM MIMO transmission over a channel bandwidth of at least 2.16 Gigahertz (GHz).

Example 16 includes the subject matter of any one of Examples 1-15, and optionally, wherein the apparatus is configured to cause the STA to transmit the OFDM MIMO transmission over a channel bandwidth of 4.32 Gigahertz (GHz), 6.48 GHz, or 8.64 GHz.

Example 17 includes the subject matter of any one of Examples 1-16, and optionally, wherein the STA is an Enhanced Directional Multi-Gigabit (EDMG) STA.

Example 18 includes the subject matter of any one of Examples 1-17, and optionally, comprising one or more antennas, a memory, and a processor.

Example 19 includes a system of wireless communication comprising a wireless communication station (STA), the STA comprising one or more antennas; a radio; a memory; a processor; and a controller configured to cause the STA to map a plurality of data symbols to Orthogonal Frequency-Division Multiplexing (OFDM) symbols in a plurality of spatial streams; map a plurality of modulated pilot sequences to the plurality of spatial streams according to a pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream; and transmit an OFDM Multiple-Input-Multiple-Output (MIMO) transmission based on the plurality of spatial streams.

Example 20 includes the subject matter of Example 19, and optionally, wherein the first plurality of OFDM symbols comprises even-numbered OFDM symbols, and the second plurality of OFDM symbols comprises odd-numbered OFDM symbols.

Example 21 includes the subject matter of Example 19 or 20, and optionally, wherein the controller is configured to cause the STA to map the first pilot sequence to the plurality of subcarriers of the first plurality of OFDM symbols in the first spatial stream based on a first scrambler bit, to map the second pilot sequence to the plurality of subcarriers of the second plurality of OFDM symbols in the first spatial stream based on a second scrambler bit, to map the sign inversion of the second pilot sequence to the plurality of subcarriers of the first plurality of OFDM symbols in the second spatial stream based on the first scrambler bit, and to map the first pilot sequence to the plurality of subcarriers of the second plurality of OFDM symbols in the second spatial stream based on the second scrambler bit.

Example 22 includes the subject matter of any one of Examples 19-21, and optionally, wherein the controller is configured to cause the STA to map a sign inversion complex conjugate of the second pilot sequence to the plurality of subcarriers of the first plurality of OFDM symbols in the second spatial stream, and to map a complex conjugate of the first pilot sequence to the plurality of subcarriers of the second plurality of OFDM symbols in the second spatial stream.

Example 23 includes the subject matter of any one of Examples 19-22, and optionally, wherein the first and second pilot sequences comprise mutually orthogonal sequences.

Example 24 includes the subject matter of any one of Examples 19-23, and optionally, wherein each of the first and second pilot sequences comprises sixteen pilot subcarriers.

Example 25 includes the subject matter of Example 24, and optionally, wherein the sixteen pilot subcarriers are evenly spaced.

Example 26 includes the subject matter of Example 25, and optionally, wherein two adjacent pilot subcarriers are 20 subcarriers apart.

Example 27 includes the subject matter of any one of Examples 24-26, and optionally, wherein the first pilot sequence comprises the sequence [+1+1+1-1+1+1-1+1+1+1+1-1-1-1+1-1], and the second pilot sequence comprises the sequence [-1-1-1+1-1-1+1-1+1+1+1-1-1-1+1+1-1].

Example 28 includes the subject matter of any one of Examples 19-27, and optionally, wherein the first and second pilot sequences comprise symbol values of ±1.

Example 29 includes the subject matter of any one of Examples 19-28, and optionally, wherein a length of each of the first and second pilot sequences is based on a channel bonding factor.

Example 30 includes the subject matter of Example 29, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 31 includes the subject matter of any one of Examples 19-30, and optionally, wherein the OFDM MIMO transmission comprises a 2×N OFDM MIMO transmission comprising two spatial transmit streams via two respective antennas.

Example 32 includes the subject matter of any one of Examples 19-31, and optionally, wherein the controller is configured to cause the STA to transmit the OFDM MIMO transmission over a frequency band above 45 Gigahertz (GHz).

Example 33 includes the subject matter of any one of Examples 19-32, and optionally, wherein the controller is configured to cause the STA to transmit the OFDM MIMO transmission over a channel bandwidth of at least 2.16 Gigahertz (GHz).

Example 34 includes the subject matter of any one of Examples 19-33, and optionally, wherein the controller is configured to cause the STA to transmit the OFDM MIMO transmission over a channel bandwidth of 4.32 Gigahertz (GHz), 6.48 GHz, or 8.64 GHz.

Example 35 includes the subject matter of any one of Examples 19-34, and optionally, wherein the STA is an Enhanced Directional Multi-Gigabit (EDMG) STA.

Example 36 includes a method to be performed at a wireless communication station (STA), the method comprising mapping a plurality of data symbols to Orthogonal Frequency-Division Multiplexing (OFDM) symbols in a plurality of spatial streams; mapping a plurality of modulated pilot sequences to the plurality of spatial streams according to a pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream; and transmitting an OFDM Multiple-Input-Multiple-Output (MIMO) transmission based on the plurality of spatial streams.

Example 37 includes the subject matter of Example 36, and optionally, wherein the first plurality of OFDM symbols comprises even-numbered OFDM symbols, and the second plurality of OFDM symbols comprises odd-numbered OFDM symbols.

Example 38 includes the subject matter of Example 36 or 37, and optionally, comprising mapping the first pilot sequence to the plurality of subcarriers of the first plurality of OFDM symbols in the first spatial stream based on a first scrambler bit, mapping the second pilot sequence to the plurality of subcarriers of the second plurality of OFDM symbols in the first spatial stream based on a second scrambler bit, mapping the sign inversion of the second pilot sequence to the plurality of subcarriers of the first plurality of OFDM symbols in the second spatial stream based on the first scrambler bit, and mapping the first pilot sequence to the plurality of subcarriers of the second plurality of OFDM symbols in the second spatial stream based on the second scrambler bit.

Example 39 includes the subject matter of any one of Examples 36-38, and optionally, comprising mapping a sign inversion complex conjugate of the second pilot sequence to the plurality of subcarriers of the first plurality of OFDM symbols in the second spatial stream, and mapping a complex conjugate of the first pilot sequence to the plurality of subcarriers of the second plurality of OFDM symbols in the second spatial stream.

Example 40 includes the subject matter of any one of Examples 36-39, and optionally, wherein the first and second pilot sequences comprise mutually orthogonal sequences.

Example 41 includes the subject matter of any one of Examples 36-40, and optionally, wherein each of the first and second pilot sequences comprises sixteen pilot subcarriers.

Example 42 includes the subject matter of Example 41, and optionally, wherein the sixteen pilot subcarriers are evenly spaced.

Example 43 includes the subject matter of Example 42, and optionally, wherein two adjacent pilot subcarriers are 20 subcarriers apart.

Example 44 includes the subject matter of any one of Examples 41-43, and optionally, wherein the first pilot sequence comprises the sequence [+1+1+1−1−1+1+1−1+1+1+1+1−1−1−1+1−1], and the second pilot sequence comprises the sequence [−1−1−1+1−1−1+1−1+1+1+1−1−1−1+1−1].

Example 45 includes the subject matter of any one of Examples 36-44, and optionally, wherein the first and second pilot sequences comprise symbol values of ±1.

Example 46 includes the subject matter of any one of Examples 36-45, and optionally, wherein a length of each of the first and second pilot sequences is based on a channel bonding factor.

Example 47 includes the subject matter of Example 46, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 48 includes the subject matter of any one of Examples 36-47, and optionally, wherein the OFDM MIMO transmission comprises a 2×N OFDM MIMO transmission comprising two spatial transmit streams via two respective antennas.

Example 49 includes the subject matter of any one of Examples 36-48, and optionally, comprising transmitting the OFDM MIMO transmission over a frequency band above 45 Gigahertz (GHz).

Example 50 includes the subject matter of any one of Examples 36-49, and optionally, comprising transmitting the OFDM MIMO transmission over a channel bandwidth of at least 2.16 Gigahertz (GHz).

Example 51 includes the subject matter of any one of Examples 36-50, and optionally, comprising transmitting the OFDM MIMO transmission over a channel bandwidth of 4.32 Gigahertz (GHz), 6.48 GHz, or 8.64 GHz.

Example 52 includes the subject matter of any one of Examples 36-51, and optionally, wherein the STA is an Enhanced Directional Multi-Gigabit (EDMG) STA.

Example 53 includes a product comprising one or more tangible computer-readable non-transitory storage media comprising computer-executable instructions operable to, when executed by at least one processor, enable the at least one processor to cause a wireless communication station (STA) to map a plurality of data symbols to Orthogonal Frequency-Division Multiplexing (OFDM) symbols in a plurality of spatial streams; map a plurality of modulated pilot sequences to the plurality of spatial streams according to a pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream; and transmit an OFDM Multi-Input-Multi-Output (MIMO) transmission based on the plurality of spatial streams.

Example 54 includes the subject matter of Example 53, and optionally, wherein the first plurality of OFDM symbols comprises even-numbered OFDM symbols, and the second plurality of OFDM symbols comprises odd-numbered OFDM symbols.

Example 55 includes the subject matter of Example 53 or 54, and optionally, wherein the instructions, when executed, cause the STA to map the first pilot sequence to the plurality of subcarriers of the first plurality of OFDM symbols in the first spatial stream based on a first scrambler bit, to map the second pilot sequence to the plurality of subcarriers of the second plurality of OFDM symbols in the first spatial stream based on a second scrambler bit, to map the sign inversion of the second pilot sequence to the plurality of subcarriers of the first plurality of OFDM symbols in the second spatial stream based on the first scrambler bit, and to map the first pilot sequence to the plurality of subcarriers of the second plurality of OFDM symbols in the second spatial stream based on the second scrambler bit.

Example 56 includes the subject matter of any one of Examples 53-55, and optionally, wherein the instructions, when executed, cause the STA to map a sign inversion complex conjugate of the second pilot sequence to the plurality of subcarriers of the first plurality of OFDM symbols in the second spatial stream, and to map a complex conjugate of the first pilot sequence to the plurality of subcarriers of the second plurality of OFDM symbols in the second spatial stream.

Example 57 includes the subject matter of any one of Examples 53-56, and optionally, wherein the first and second pilot sequences comprise mutually orthogonal sequences.

Example 58 includes the subject matter of any one of Examples 53-57, and optionally, wherein each of the first and second pilot sequences comprises sixteen pilot subcarriers.

Example 59 includes the subject matter of Example 58, and optionally, wherein the sixteen pilot subcarriers are evenly spaced.

Example 60 includes the subject matter of Example 59, and optionally, wherein two adjacent pilot subcarriers are 20 subcarriers apart.

Example 61 includes the subject matter of any one of Examples 58-60, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 62 includes the subject matter of any one of Examples 53-61, and optionally, wherein the first and second pilot sequences comprise symbol values of ±1.

Example 63 includes the subject matter of any one of Examples 53-62, and optionally, wherein a length of each of the first and second pilot sequences is based on a channel bonding factor.

Example 64 includes the subject matter of Example 63, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 65 includes the subject matter of any one of Examples 53-64, and optionally, wherein the OFDM MIMO transmission comprises a 2×N OFDM MIMO transmission comprising two spatial transmit streams via two respective antennas.

Example 66 includes the subject matter of any one of Examples 53-65, and optionally, wherein the instructions, when executed, cause the STA to transmit the OFDM MIMO transmission over a frequency band above 45 Gigahertz (GHz).

Example 67 includes the subject matter of any one of Examples 53-66, and optionally, wherein the instructions, when executed, cause the STA to transmit the OFDM MIMO transmission over a channel bandwidth of at least 2.16 Gigahertz (GHz).

Example 68 includes the subject matter of any one of Examples 53-67, and optionally, wherein the instructions, when executed, cause the STA to transmit the OFDM MIMO transmission over a channel bandwidth of 4.32 Gigahertz (GHz), 6.48 GHz, or 8.64 GHz.

Example 69 includes the subject matter of any one of Examples 53-68, and optionally, wherein the STA is an Enhanced Directional Multi-Gigabit (EDMG) STA.

Example 70 includes an apparatus of wireless communication by a wireless communication station (STA), the apparatus comprising means for mapping a plurality of data symbols to Orthogonal Frequency-Division Multiplexing (OFDM) symbols in a plurality of spatial streams; means for mapping a plurality of modulated pilot sequences to the plurality of spatial streams according to a pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream; and means for transmitting an OFDM Multiple-Input-Multiple-Output (MIMO) transmission based on the plurality of spatial streams.

Example 71 includes the subject matter of Example 70, and optionally, wherein the first plurality of OFDM symbols comprises even-numbered OFDM symbols, and the second plurality of OFDM symbols comprises odd-numbered OFDM symbols.

Example 72 includes the subject matter of Example 70 or 71, and optionally, comprising means for mapping the first pilot sequence to the plurality of subcarriers of the first plurality of OFDM symbols in the first spatial stream based on a first scrambler bit, mapping the second pilot sequence to the plurality of subcarriers of the second plurality of OFDM symbols in the first spatial stream based on a second scrambler bit, mapping the sign inversion of the second pilot sequence to the plurality of subcarriers of the first plurality of OFDM symbols in the second spatial stream based on the first scrambler bit, and mapping the first pilot sequence to the plurality of subcarriers of the second plurality of OFDM symbols in the second spatial stream based on the second scrambler bit.

Example 73 includes the subject matter of any one of Examples 70-72, and optionally, comprising means for mapping a sign inversion complex conjugate of the second pilot sequence to the plurality of subcarriers of the first plurality of OFDM symbols in the second spatial stream, and mapping a complex conjugate of the first pilot sequence to the plurality of subcarriers of the second plurality of OFDM symbols in the second spatial stream.

Example 74 includes the subject matter of any one of Examples 70-73, and optionally, wherein the first and second pilot sequences comprise mutually orthogonal sequences.

Example 75 includes the subject matter of any one of Examples 70-74, and optionally, wherein each of the first and second pilot sequences comprises sixteen pilot subcarriers.

Example 76 includes the subject matter of Example 75, and optionally, wherein the sixteen pilot subcarriers are evenly spaced.

Example 77 includes the subject matter of Example 76, and optionally, wherein two adjacent pilot subcarriers are 20 subcarriers apart.

Example 78 includes the subject matter of any one of Examples 75-77, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 79 includes the subject matter of any one of Examples 70-78, and optionally, wherein the first and second pilot sequences comprise symbol values of ±1.

Example 80 includes the subject matter of any one of Examples 70-79, and optionally, wherein a length of each of the first and second pilot sequences is based on a channel bonding factor.

Example 81 includes the subject matter of Example 80, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 82 includes the subject matter of any one of Examples 70-81, and optionally, wherein the OFDM MIMO transmission comprises a 2×N OFDM MIMO transmission comprising two spatial transmit streams via two respective antennas.

Example 83 includes the subject matter of any one of Examples 70-82, and optionally, comprising means for transmitting the OFDM MIMO transmission over a frequency band above 45 Gigahertz (GHz).

Example 84 includes the subject matter of any one of Examples 70-83, and optionally, comprising means for transmitting the OFDM MIMO transmission over a channel bandwidth of at least 2.16 Gigahertz (GHz).

Example 85 includes the subject matter of any one of Examples 70-84, and optionally, comprising means for transmitting the OFDM MIMO transmission over a channel bandwidth of 4.32 Gigahertz (GHz), 6.48 GHz, or 8.64 GHz.

Example 86 includes the subject matter of any one of Examples 70-85, and optionally, wherein the STA is an Enhanced Directional Multi-Gigabit (EDMG) STA.

Example 87 includes an apparatus comprising logic and circuitry configured to cause a wireless communication station (STA) to receive an Orthogonal Frequency-Division Multiplexing (OFDM) Multiple-Input-Multiple-Output (MIMO) transmission comprising a plurality of spatial streams; and process the OFDM MIMO transmission according to a diversity scheme comprising a plurality of data symbols mapped to OFDM symbols in the plurality of spatial streams and a plurality of modulated pilot sequences mapped to the OFDM symbols according to a pilot mapping scheme, the pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream.

Example 88 includes the subject matter of Example 87, and optionally, wherein the first plurality of OFDM symbols comprises even-numbered OFDM symbols, and the second plurality of OFDM symbols comprises odd-numbered OFDM symbols.

Example 89 includes the subject matter of Example 87 or 88, and optionally, wherein the first pilot sequence is mapped to the plurality of subcarriers of the first plurality of OFDM symbols in the first spatial stream based on a first scrambler bit, the second pilot sequence is mapped to the plurality of subcarriers of the second plurality of OFDM symbols in the first spatial stream based on a second scrambler bit, the sign inversion of the second pilot sequence is mapped to the plurality of subcarriers of the first plurality of OFDM symbols in the second spatial stream based on the first scrambler bit, and the first pilot sequence is mapped to the plurality of subcarriers of the second plurality of OFDM symbols in the second spatial stream based on the second scrambler bit.

Example 90 includes the subject matter of any one of Examples 87-89, and optionally, wherein a sign inversion complex conjugate of the second pilot sequence is mapped to the plurality of subcarriers of the first plurality of OFDM symbols in the second spatial stream, and a complex conjugate of the first pilot sequence is mapped to the plurality of subcarriers of the second plurality of OFDM symbols in the second spatial stream.

Example 91 includes the subject matter of any one of Examples 87-90, and optionally, wherein the first and second pilot sequences comprise mutually orthogonal sequences.

Example 92 includes the subject matter of any one of Examples 87-91, and optionally, wherein each of the first and second pilot sequences comprises sixteen pilot subcarriers.

Example 93 includes the subject matter of Example 92, and optionally, wherein the sixteen pilot subcarriers are evenly spaced.

Example 94 includes the subject matter of Example 93, and optionally, wherein two adjacent pilot subcarriers are 20 subcarriers apart.

Example 95 includes the subject matter of any one of Examples 92-94, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 96 includes the subject matter of any one of Examples 87-95, and optionally, wherein the first and second pilot sequences comprise symbol values of ±1.

Example 97 includes the subject matter of any one of Examples 87-96, and optionally, wherein a length of each of the first and second pilot sequences is based on a channel bonding factor.

Example 98 includes the subject matter of Example 97, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 99 includes the subject matter of any one of Examples 87-98, and optionally, wherein the OFDM MIMO transmission comprises a 2×N OFDM MIMO transmission comprising two spatial transmit streams via two respective antennas.

Example 100 includes the subject matter of any one of Examples 87-99, and optionally, wherein the apparatus is configured to cause the STA to receive the OFDM MIMO transmission over a frequency band above 45 Gigahertz (GHz).

Example 101 includes the subject matter of any one of Examples 87-100, and optionally, wherein the apparatus is configured to cause the STA to receive the OFDM MIMO transmission over a channel bandwidth of at least 2.16 Gigahertz (GHz).

Example 102 includes the subject matter of any one of Examples 87-101, and optionally, wherein the apparatus is configured to cause the STA to receive the OFDM MIMO transmission over a channel bandwidth of 4.32 Gigahertz (GHz), 6.48 GHz, or 8.64 GHz.

Example 103 includes the subject matter of any one of Examples 87-102, and optionally, wherein the STA is an Enhanced Directional Multi-Gigabit (EDMG) STA.

Example 104 includes the subject matter of any one of Examples 87-103, and optionally, comprising one or more antennas, a memory, and a processor.

Example 105 includes a system of wireless communication comprising a wireless communication station (STA), the STA comprising one or more antennas; a radio; a memory; a processor; and a controller configured to cause the STA to receive an Orthogonal Frequency-Division Multiplexing (OFDM) Multiple-Input-Multiple-Output (MIMO) transmission comprising a plurality of spatial streams; and process the OFDM MIMO transmission according to a diversity scheme comprising a plurality of data symbols mapped to OFDM symbols in the plurality of spatial streams and a plurality of modulated pilot sequences mapped to the OFDM symbols according to a pilot mapping scheme, the pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream.

Example 106 includes the subject matter of Example 105, and optionally, wherein the first plurality of OFDM symbols comprises even-numbered OFDM symbols, and the second plurality of OFDM symbols comprises odd-numbered OFDM symbols.

Example 107 includes the subject matter of Example 105 or 106, and optionally, wherein the first pilot sequence is mapped to the plurality of subcarriers of the first plurality of OFDM symbols in the first spatial stream based on a first scrambler bit, the second pilot sequence is mapped to the plurality of subcarriers of the second plurality of OFDM symbols in the first spatial stream based on a second scrambler bit, the sign inversion of the second pilot sequence is mapped to the plurality of subcarriers of the first plurality of OFDM symbols in the second spatial stream based on the first scrambler bit, and the first pilot sequence is mapped to the plurality of subcarriers of the second plurality of OFDM symbols in the second spatial stream based on the second scrambler bit.

Example 108 includes the subject matter of any one of Examples 105-107, and optionally, wherein a sign inversion complex conjugate of the second pilot sequence is mapped to the plurality of subcarriers of the first plurality of OFDM symbols in the second spatial stream, and a complex conjugate of the first pilot sequence is mapped to the plurality of subcarriers of the second plurality of OFDM symbols in the second spatial stream.

Example 109 includes the subject matter of any one of Examples 105-108, and optionally, wherein the first and second pilot sequences comprise mutually orthogonal sequences.

Example 110 includes the subject matter of any one of Examples 105-109, and optionally, wherein each of the first and second pilot sequences comprises sixteen pilot subcarriers.

Example 111 includes the subject matter of Example 110, and optionally, wherein the sixteen pilot subcarriers are evenly spaced.

Example 112 includes the subject matter of Example 111, and optionally, wherein two adjacent pilot subcarriers are 20 subcarriers apart.

Example 113 includes the subject matter of any one of Examples 110-112, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 114 includes the subject matter of any one of Examples 105-113, and optionally, wherein the first and second pilot sequences comprise symbol values of ±1.

Example 115 includes the subject matter of any one of Examples 105-114, and optionally, wherein a length of each of the first and second pilot sequences is based on a channel bonding factor.

Example 116 includes the subject matter of Example 115, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 117 includes the subject matter of any one of Examples 105-116, and optionally, wherein the OFDM MIMO transmission comprises a 2×N OFDM MEMO transmission comprising two spatial transmit streams via two respective antennas.

Example 118 includes the subject matter of any one of Examples 105-117, and optionally, wherein the controller is configured to cause the STA to receive the OFDM MIMO transmission over a frequency band above 45 Gigahertz (GHz).

Example 119 includes the subject matter of any one of Examples 105-118, and optionally, wherein the controller is configured to cause the STA to receive the OFDM MIMO transmission over a channel bandwidth of at least 2.16 Gigahertz (GHz).

Example 120 includes the subject matter of any one of Examples 105-119, and optionally, wherein the controller is configured to cause the STA to receive the OFDM MIMO transmission over a channel bandwidth of 4.32 Gigahertz (GHz), 6.48 GHz, or 8.64 GHz.

Example 121 includes the subject matter of any one of Examples 105-120, and optionally, wherein the STA is an Enhanced Directional Multi-Gigabit (EDMG) STA.

Example 122 includes a method to be performed at a wireless communication station (STA), the method comprising receiving an Orthogonal Frequency-Division Multiplexing (OFDM) Multiple-Input-Multiple-Output (MIMO) transmission comprising a plurality of spatial streams; and processing the OFDM MIMO transmission according to a diversity scheme comprising a plurality of data symbols mapped to OFDM symbols in the plurality of spatial streams, and a plurality of modulated pilot sequences mapped to the OFDM symbols according to a pilot mapping scheme, the pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream.

Example 123 includes the subject matter of Example 122, and optionally, wherein the first plurality of OFDM symbols comprises even-numbered OFDM symbols, and the second plurality of OFDM symbols comprises odd-numbered OFDM symbols.

Example 124 includes the subject matter of Example 122 or 123, and optionally, wherein the first pilot sequence is mapped to the plurality of subcarriers of the first plurality of OFDM symbols in the first spatial stream based on a first scrambler bit, the second pilot sequence is mapped to the plurality of subcarriers of the second plurality of OFDM symbols in the first spatial stream based on a second scrambler bit, the sign inversion of the second pilot sequence is mapped to the plurality of subcarriers of the first plurality of OFDM symbols in the second spatial stream based on the first scrambler bit, and the first pilot sequence is mapped to the plurality of subcarriers of the second plurality of OFDM symbols in the second spatial stream based on the second scrambler bit.

Example 125 includes the subject matter of any one of Examples 122-124, and optionally, wherein a sign inversion complex conjugate of the second pilot sequence is mapped to the plurality of subcarriers of the first plurality of OFDM symbols in the second spatial stream, and a complex conjugate of the first pilot sequence is mapped to the plurality of subcarriers of the second plurality of OFDM symbols in the second spatial stream.

Example 126 includes the subject matter of any one of Examples 122-125, and optionally, wherein the first and second pilot sequences comprise mutually orthogonal sequences.

Example 127 includes the subject matter of any one of Examples 122-126, and optionally, wherein each of the first and second pilot sequences comprises sixteen pilot subcarriers.

Example 128 includes the subject matter of Example 127, and optionally, wherein the sixteen pilot subcarriers are evenly spaced.

Example 129 includes the subject matter of Example 128, and optionally, wherein two adjacent pilot subcarriers are 20 subcarriers apart.

Example 130 includes the subject matter of any one of Examples 127-129, and optionally, wherein the first pilot sequence comprises the sequence [+1+1+1−1+1+1−1+1+1+1+1−1−1+1−1], and the second pilot sequence comprises the sequence [−1−1−1+1−1−1+1−1+1+1+1−1−1−1+1−1].

Example 131 includes the subject matter of any one of Examples 122-130, and optionally, wherein the first and second pilot sequences comprise symbol values of ±1.

Example 132 includes the subject matter of any one of Examples 122-131, and optionally, wherein a length of each of the first and second pilot sequences is based on a channel bonding factor.

Example 133 includes the subject matter of Example 132, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 134 includes the subject matter of any one of Examples 122-133, and optionally, wherein the OFDM MIMO transmission comprises a 2×N OFDM MIMO transmission comprising two spatial transmit streams via two respective antennas.

Example 135 includes the subject matter of any one of Examples 122-134, and optionally, comprising receiving the OFDM MIMO transmission over a frequency band above 45 Gigahertz (GHz).

Example 136 includes the subject matter of any one of Examples 122-135, and optionally, comprising receiving the OFDM MIMO transmission over a channel bandwidth of at least 2.16 Gigahertz (GHz).

Example 137 includes the subject matter of any one of Examples 122-136, and optionally, comprising receiving the OFDM MIMO transmission over a channel bandwidth of 4.32 Gigahertz (GHz), 6.48 GHz, or 8.64 GHz.

Example 138 includes the subject matter of any one of Examples 122-137, and optionally, wherein the STA is an Enhanced Directional Multi-Gigabit (EDMG) STA.

Example 139 includes a product comprising one or more tangible computer-readable non-transitory storage media comprising computer-executable instructions operable to, when executed by at least one processor, enable the at least one processor to cause a wireless communication station (STA) to receive an Orthogonal Frequency-Division Multiplexing (OFDM) Multiple-Input-Multiple-Output (MIMO) transmission comprising a plurality of spatial streams; and process the OFDM MIMO transmission according to a diversity scheme comprising a plurality of data symbols mapped to OFDM symbols in the plurality of spatial streams, and a plurality of modulated pilot sequences mapped to the OFDM symbols according to a pilot mapping scheme, the pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream.

Example 140 includes the subject matter of Example 139, and optionally, wherein the first plurality of OFDM symbols comprises even-numbered OFDM symbols, and the second plurality of OFDM symbols comprises odd-numbered OFDM symbols.

Example 141 includes the subject matter of Example 139 or 140, and optionally, wherein the first pilot sequence is mapped to the plurality of subcarriers of the first plurality of OFDM symbols in the first spatial stream based on a first scrambler bit, the second pilot sequence is mapped to the plurality of subcarriers of the second plurality of OFDM symbols in the first spatial stream based on a second scrambler bit, the sign inversion of the second pilot sequence is mapped to the plurality of subcarriers of the first plurality of OFDM symbols in the second spatial stream based on the first scrambler bit, and the first pilot sequence is mapped to the plurality of subcarriers of the second plurality of OFDM symbols in the second spatial stream based on the second scrambler bit.

Example 142 includes the subject matter of any one of Examples 139-141, and optionally, wherein a sign inversion complex conjugate of the second pilot sequence is mapped to the plurality of subcarriers of the first plurality of OFDM symbols in the second spatial stream, and a complex conjugate of the first pilot sequence is mapped to the plurality of subcarriers of the second plurality of OFDM symbols in the second spatial stream.

Example 143 includes the subject matter of any one of Examples 139-142, and optionally, wherein the first and second pilot sequences comprise mutually orthogonal sequences.

Example 144 includes the subject matter of any one of Examples 139-143, and optionally, wherein each of the first and second pilot sequences comprises sixteen pilot subcarriers.

Example 145 includes the subject matter of Example 144, and optionally, wherein the sixteen pilot subcarriers are evenly spaced.

Example 146 includes the subject matter of Example 145, and optionally, wherein two adjacent pilot subcarriers are 20 subcarriers apart.

Example 147 includes the subject matter of any one of Examples 144-146, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 148 includes the subject matter of any one of Examples 139-147, and optionally, wherein the first and second pilot sequences comprise symbol values of ±1.

Example 149 includes the subject matter of any one of Examples 139-148, and optionally, wherein a length of each of the first and second pilot sequences is based on a channel bonding factor.

Example 150 includes the subject matter of Example 149, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 151 includes the subject matter of any one of Examples 139-150, and optionally, wherein the OFDM MIMO transmission comprises a 2×N OFDM MIMO transmission comprising two spatial transmit streams via two respective antennas.

Example 152 includes the subject matter of any one of Examples 139-151, and optionally, wherein the instructions, when executed, cause the STA to receive the OFDM MIMO transmission over a frequency band above 45 Gigahertz (GHz).

Example 153 includes the subject matter of any one of Examples 139-152, and optionally, wherein the instructions, when executed, cause the STA to receive the OFDM MIMO transmission over a channel bandwidth of at least 2.16 Gigahertz (GHz).

Example 154 includes the subject matter of any one of Examples 139-153, and optionally, wherein the instructions, when executed, cause the STA to receive the OFDM MIMO transmission over a channel bandwidth of 4.32 Gigahertz (GHz), 6.48 GHz, or 8.64 GHz.

Example 155 includes the subject matter of any one of Examples 139-154, and optionally, wherein the STA is an Enhanced Directional Multi-Gigabit (EDMG) STA.

Example 156 includes an apparatus of wireless communication by a wireless communication station (STA), the apparatus comprising means for receiving an Orthogonal Frequency-Division Multiplexing (OFDM) Multiple-Input-Multiple-Output (MIMO) transmission comprising a plurality of spatial streams; and means for processing the OFDM MIMO transmission according to a diversity scheme comprising a plurality of data symbols mapped to OFDM symbols in the plurality of spatial streams, and a plurality of modulated pilot sequences mapped to the OFDM symbols according to a pilot mapping scheme, the pilot mapping scheme comprising a first modulated pilot sequence mapped to a first spatial stream and a second modulated pilot sequence mapped to a second spatial stream, the first modulated pilot sequence comprising a first pilot sequence mapped to a plurality of subcarriers of a first plurality of OFDM symbols in the first spatial stream and a second pilot sequence mapped to a plurality of subcarriers of a second plurality of OFDM symbols in the first spatial stream, the second modulated pilot sequence comprising a sign inversion of the second pilot sequence mapped to the plurality of subcarriers of the first plurality of OFDM symbols in the second spatial stream and the first pilot sequence mapped to the plurality of subcarriers of the second plurality of OFDM symbols in the second spatial stream.

Example 157 includes the subject matter of Example 156, and optionally, wherein the first plurality of OFDM symbols comprises even-numbered OFDM symbols, and the second plurality of OFDM symbols comprises odd-numbered OFDM symbols.

Example 158 includes the subject matter of Example 156 or 157, and optionally, wherein the first pilot sequence is mapped to the plurality of subcarriers of the first plurality of OFDM symbols in the first spatial stream based on a first scrambler bit, the second pilot sequence is mapped to the plurality of subcarriers of the second plurality of OFDM symbols in the first spatial stream based on a second scrambler bit, the sign inversion of the second pilot sequence is mapped to the plurality of subcarriers of the first plurality of OFDM symbols in the second spatial stream based on the first scrambler bit, and the first pilot sequence is mapped to the plurality of subcarriers of the second plurality of OFDM symbols in the second spatial stream based on the second scrambler bit.

Example 159 includes the subject matter of any one of Examples 156-158, and optionally, wherein a sign inversion complex conjugate of the second pilot sequence is mapped to the plurality of subcarriers of the first plurality of OFDM symbols in the second spatial stream, and a complex conjugate of the first pilot sequence is mapped to the plurality of subcarriers of the second plurality of OFDM symbols in the second spatial stream.

Example 160 includes the subject matter of any one of Examples 156-159, and optionally, wherein the first and second pilot sequences comprise mutually orthogonal sequences.

Example 161 includes the subject matter of any one of Examples 156-160, and optionally, wherein each of the first and second pilot sequences comprises sixteen pilot subcarriers.

Example 162 includes the subject matter of Example 161, and optionally, wherein the sixteen pilot subcarriers are evenly spaced.

Example 163 includes the subject matter of Example 162, and optionally, wherein two adjacent pilot subcarriers are 20 subcarriers apart.

Example 164 includes the subject matter of any one of Examples 161-163, and optionally, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

Example 165 includes the subject matter of any one of Examples 156-164, and optionally, wherein the first and second pilot sequences comprise symbol values of ±1.

Example 166 includes the subject matter of any one of Examples 156-165, and optionally, wherein a length of each of the first and second pilot sequences is based on a channel bonding factor.

Example 167 includes the subject matter of Example 166, and optionally, wherein each of the first and second pilot sequences comprises a length of 16, 36, 56, or 76 subcarriers, the length of 16 subcarriers corresponds to a channel bonding factor of 1, the length of 36 subcarriers corresponds to a channel bonding factor of 2, the length of 56 subcarriers corresponds to a channel bonding factor of 3, the length of 76 subcarriers corresponds to a channel bonding factor of 4.

Example 168 includes the subject matter of any one of Examples 156-167, and optionally, wherein the OFDM MIMO transmission comprises a 2×N OFDM MIMO transmission comprising two spatial transmit streams via two respective antennas.

Example 169 includes the subject matter of any one of Examples 156-168, and optionally, comprising means for receiving the OFDM MIMO transmission over a frequency band above 45 Gigahertz (GHz).

Example 170 includes the subject matter of any one of Examples 156-169, and optionally, comprising means for receiving the OFDM MIMO transmission over a channel bandwidth of at least 2.16 Gigahertz (GHz).

Example 171 includes the subject matter of any one of Examples 156-170, and optionally, comprising means for receiving the OFDM MIMO transmission over a channel bandwidth of 4.32 Gigahertz (GHz), 6.48 GHz, or 8.64 GHz.

Example 172 includes the subject matter of any one of Examples 156-171, and optionally, wherein the STA is an Enhanced Directional Multi-Gigabit (EDMG) STA.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause an Enhanced Directional Multi-Gigabit (EDMG) wireless communication station (STA) to:
  map data to Orthogonal Frequency-Division Multiplexing (OFDM) symbols in a plurality of space-time streams;
  determine a plurality of modulated pilot sequences for the plurality of space-time streams, the plurality of modulated pilot sequences comprising:
    a first modulated pilot sequence in a first space-time stream of the plurality of space-time streams, the first modulated pilot sequence comprising a first pilot sequence mapped to a plurality of subcarriers of a first plurality of OFDM symbols in the first space-time stream, and a second pilot sequence mapped to a plurality of subcarriers of a second plurality of OFDM symbols in the first space-time stream, and
    a second modulated pilot sequence in a second space-time stream of the plurality of space-time streams, the second modulated pilot sequence comprising a sign inversion of the second pilot sequence mapped to the plurality of subcarriers of the first plurality of OFDM symbols in the second space-time stream, and the first pilot sequence mapped to the plurality of subcarriers of the second plurality of OFDM symbols in the second space-time stream; and
  transmit an OFDM transmission over a wireless communication channel in a frequency band above 45 Gigahertz (GHz), the OFDM transmission based on the plurality of space-time streams.

2. The apparatus of claim 1, wherein the first plurality of OFDM symbols comprises even-numbered OFDM symbols, and the second plurality of OFDM symbols comprises odd-numbered OFDM symbols.

3. The apparatus of claim 1, wherein the first space-time stream comprises an odd-numbered space-time stream, and the second space-time stream comprises an even-numbered space-time stream.

4. The apparatus of claim 1 configured to cause the EDMG STA to map the first pilot sequence to the plurality of subcarriers of the first plurality of OFDM symbols in the first space-time stream based on a first scrambler bit, to map the second pilot sequence to the plurality of subcarriers of the second plurality of OFDM symbols in the first space-time stream based on a second scrambler bit, to map the sign inversion of the second pilot sequence to the plurality of subcarriers of the first plurality of OFDM symbols in the second space-time stream based on the first scrambler bit, and to map the first pilot sequence to the plurality of subcarriers of the second plurality of OFDM symbols in the second space-time stream based on the second scrambler bit.

5. The apparatus of claim 4, wherein the first scrambler bit has a first index, and the second scrambler bit has a second index subsequent to the first index.

6. The apparatus of claim 1 configured to cause the EDMG STA to determine the first modulated pilot sequence for the first space-time stream comprising a space-time stream index $i_{STS}=1$ as follows:

$$P(i_{STS}=1, 2n, M_p(k)) = P_{N_{SP}}(i_{STS}=1, k) \cdot (2p(2n)-1)$$

$$P(i_{STS}=1, 2n+1, M_p(k)) = P_{N_{SP}}(i_{STS}=2, k) \cdot (2p(2n+1)-1)$$

and to determine the second modulated pilot sequence for the second space-time stream comprising a space-time stream index $i_{STS}=2$ as follows:

$$P(i_{STS}=2, 2n, M_p(k)) = -P_{N_{SP}}(i_{STS}=2, k) \cdot (2p(2n)-1)$$

$$P(i_{STS}=2, 2n+1, M_p(k)) = P_{N_{SP}}(i_{STS}=1, k) \cdot (2p(2n+1)-1)$$

wherein:
$P_{N_{SP}}(i_{STS}, k)$ denotes a pilot sequence corresponding to an $i_{STS}$-th space-time stream, wherein $k=0, 1, \ldots, N_{SP}-1$, and $N_{SP}$ denotes a total number of pilot subcarriers in the pilot sequence,
$M_p(k)$ denotes a mapped pilot subcarrier index corresponding to a k-th pilot subcarrier,
n denotes an OFDM symbol index, and
p(n) denotes a bit from a scrambler corresponding to the index n.

7. The apparatus of claim 1, wherein each of the first and second pilot sequences comprises pilot values of ±1.

8. The apparatus of claim 1, wherein a length of each of the first and second pilot sequences is based on a channel-bonding factor.

9. The apparatus of claim 1, wherein each of the first and second pilot sequences has a length of 16 pilot values, when a channel-bonding factor is 1.

10. The apparatus of claim 1, wherein each of the first and second pilot sequences has a length of 36 pilot values, when a channel-bonding factor is 2.

11. The apparatus of claim 1, wherein each of the first and second pilot sequences has a length of 56 pilot values, when a channel-bonding factor is 3.

12. The apparatus of claim 1, wherein each of the first and second pilot sequences has a length of 76 pilot values, when a channel-bonding factor is 4.

13. The apparatus of claim 1, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

14. The apparatus of claim 1, wherein the wireless communication channel comprises a channel bandwidth of at least 2.16 Gigahertz (GHz).

15. The apparatus of claim 1, wherein the wireless communication channel comprises a channel bandwidth of 4.32 Gigahertz (GHz), 6.48 GHz, or 8.64 GHz.

16. The apparatus of claim 1 comprising a radio, the processor configured to cause the radio to transmit the OFDM transmission.

17. The apparatus of claim 16 comprising two or more antennas connected to the radio, and another processor to execute instructions of an operating system.

18. One or more tangible computer-readable non-transitory storage media comprising computer-executable instructions operable to, when executed by at least one processor, enable the at least one processor to cause an Enhanced Directional Multi-Gigabit (EDMG) wireless communication station (STA) to:
map data to Orthogonal Frequency-Division Multiplexing (OFDM) symbols in a plurality of space-time streams;
determine a plurality of modulated pilot sequences for the plurality of space-time streams, the plurality of modulated pilot sequences comprising:
a first modulated pilot sequence in a first space-time stream of the plurality of space-time streams, the first modulated pilot sequence comprising a first pilot sequence mapped to a plurality of subcarriers of a first plurality of OFDM symbols in the first space-time stream, and a second pilot sequence mapped to a plurality of subcarriers of a second plurality of OFDM symbols in the first space-time stream, and
a second modulated pilot sequence in a second space-time stream of the plurality of space-time streams, the second modulated pilot sequence comprising a sign inversion of the second pilot sequence mapped to the plurality of subcarriers of the first plurality of OFDM symbols in the second space-time stream, and the first pilot sequence mapped to the plurality of subcarriers of the second plurality of OFDM symbols in the second space-time stream; and
transmit an OFDM transmission over a wireless communication channel in a frequency band above 45 Gigahertz (GHz), the OFDM transmission based on the plurality of space-time streams.

19. The one or more tangible computer-readable non-transitory storage media of claim 18, wherein the instructions, when executed, cause the EDMG STA to map the first pilot sequence to the plurality of subcarriers of the first plurality of OFDM symbols in the first space-time stream based on a first scrambler bit, to map the second pilot sequence to the plurality of subcarriers of the second plurality of OFDM symbols in the first space-time stream based on a second scrambler bit, to map the sign inversion of the second pilot sequence to the plurality of subcarriers of the first plurality of OFDM symbols in the second space-time stream based on the first scrambler bit, and to map the first pilot sequence to the plurality of subcarriers of the second plurality of OFDM symbols in the second space-time stream based on the second scrambler bit.

20. The one or more tangible computer-readable non-transitory storage media of claim 18, wherein the instructions, when executed, cause the EDMG STA to determine the first modulated pilot sequence for the first space-time stream comprising a space-time stream index $i_{STS}=1$ as follows:

$$P(i_{STS}=1,2n,M_p(k))=P_{NSP}(i_{STS}=1,k)\cdot(2p(2n)-1)$$

$$P(i_{STS}=1,2n+1,M_p(k))=P_{NSP}(i_{STS}=2,k)\cdot(2p(2n+1)-1)$$

and to determine the second modulated pilot sequence for the second space-time stream comprising a space-time stream index $i_{STS}=2$ as follows:

$$P(i_{STS}=2,2n,M_p(k))=-P_{NSP}(i_{STS}=2,k)\cdot(2p(2n)-1)$$

$$P(i_{STS}=2,2n+1,M_p(k))=P_{NSP}(i_{STS}=1,k)\cdot(2p(2n+1)-1)$$

wherein:
$P_{NSP}(i_{STS},k)$ denotes a pilot sequence corresponding to an $i_{STS}$-th space-time stream, wherein $k=0, 1, \ldots, N_{SP}-1$, and $N_{SP}$ denotes a total number of pilot subcarriers in the pilot sequence,
$M_p(k)$ denotes a mapped pilot subcarrier index corresponding to a k-th pilot subcarrier,
n denotes an OFDM symbol index, and
p(n) denotes a bit from a scrambler corresponding to the index n.

21. The one or more tangible computer-readable non-transitory storage media of claim 18, wherein a length of each of the first and second pilot sequences is based on a channel-bonding factor.

22. The one or more tangible computer-readable non-transitory storage media of claim 18, wherein the first pilot sequence comprises the sequence [+1+1+1−1+1+1−1+1+1+1+1−1−1−1+1−1], and the second pilot sequence comprises the sequence [−1−1−1+1−1−1+1−1+1+1+1−1−1−1+1−1].

23. An apparatus for an Enhanced Directional Multi-Gigabit (EDMG) wireless communication station (STA), the apparatus comprising:
means for mapping data to Orthogonal Frequency-Division Multiplexing (OFDM) symbols in a plurality of space-time streams;
means for determining a plurality of modulated pilot sequences for the plurality of space-time streams, the plurality of modulated pilot sequences comprising:
a first modulated pilot sequence in a first space-time stream of the plurality of space-time streams, the first modulated pilot sequence comprising a first pilot sequence mapped to a plurality of subcarriers of a first plurality of OFDM symbols in the first space-time stream, and a second pilot sequence mapped to a plurality of subcarriers of a second plurality of OFDM symbols in the first space-time stream, and
a second modulated pilot sequence in a second space-time stream of the plurality of space-time streams, the second modulated pilot sequence comprising a sign inversion of the second pilot sequence mapped to the plurality of subcarriers of the first plurality of OFDM symbols in the second space-time stream, and the first pilot sequence mapped to the plurality of subcarriers of the second plurality of OFDM symbols in the second space-time stream; and means for causing the EDMG STA to transmit an OFDM transmission over a wireless communication channel in a frequency band above 45 Gigahertz (GHz), the OFDM transmission based on the plurality of space-time streams.

24. The apparatus of claim 23 comprising means for determining the first modulated pilot sequence for the first space-time stream comprising a space-time stream index $i_{STS}=1$ as follows:

$$P(i_{STS}=1,2n,M_p(k))=P_{N_{SP}}(i_{STS}=1,k)\cdot(2p(2n)-1)$$

$$P(i_{STS}=1,2n+1,M_p(k))=P_{N_{SP}}(i_{STS}=2,k)\cdot(2p(2n+1)-1)$$

and to determine the second modulated pilot sequence for the second space-time stream comprising a space-time stream index $i_{STS}=2$ as follows:

$$P(i_{STS}=2,2n,M_p(k))=-P_{N_{SP}}(i_{STS}=2,k)\cdot(2p(2n)-1)$$

$$P(i_{STS}=2,2n+1,M_p(k))=P_{N_{SP}}(i_{STS}=1,k)\cdot(2p(2n+1)-1)$$

wherein $P_{N_{SP}}(i_{STS},k)$ denotes a pilot sequence corresponding to an $i_{STS}$-th space-time stream, wherein $k=0, 1, \ldots, N_{SP}-1$, and $N_{SP}$ denotes a total number of pilot subcarriers in the pilot sequence, $M_p(k)$ denotes a mapped pilot subcarrier index corresponding to a k-th pilot subcarrier, n denotes an OFDM symbol index, and p(n) denotes a bit from a scrambler corresponding to the index n.

* * * * *